(12) United States Patent
Haaland

(10) Patent No.: US 6,415,233 B1
(45) Date of Patent: Jul. 2, 2002

(54) CLASSICAL LEAST SQUARES MULTIVARIATE SPECTRAL ANALYSIS

(75) Inventor: David M. Haaland, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/518,351

(22) Filed: Mar. 3, 2000

Related U.S. Application Data

(60) Provisional application No. 60/123,020, filed on Mar. 4, 1999.

(51) Int. Cl.$^7$ .............................................. G01N 33/48

(52) U.S. Cl. .......................................... 702/22; 430/12

(58) Field of Search ........................ 702/22, 23, 24–26, 702/30, 181, 189–190, 196–199; 430/12

(56) References Cited

U.S. PATENT DOCUMENTS 5,435,309 A * 7/1995 Thomas et al. ............. 128/633
5,838,008 A * 11/1998 Esler et al. ............ 250/339.08

OTHER PUBLICATIONS

D. M. Haaland, "Multivariate Calibration Methods Applied to Quantitative FT–IR Analyses," Chapter 8 in *Practical Fourier Transform Infrared Spectroscopy*, J. R. Ferraro and K. Krishnan, Editors, Academic Press, New York, pp. 396–468, (1989)).

D. M. Haaland and E. V. Thomas, "Partial Least–Squares Methods for Spectral Analyses 1: Relation to Other Multivariate Calibration Methods and the Extraction of Qualitative Information," Analytical Chemistry 60, 1193–1202 (1988)).

Lindberg, J.–A. Persson, and S. Wold, Partial Least–Squares method for Spectrofluorimetric Analysis of Mixtures of Humic Aid and Ligninsulfonate, Anal. Chem. 55, 643 (1983).

D. M. Haaland, R. G. Easterling, and D. A. Vopicka, "Multivariate Least–Squares Methods Applied to the Quantitative Spectral Analysis of Multicomponent Samples," Applied Spectroscopy 39, 73–84 (1985).

D. M. Haaland and R.G. Easterling, "Improved Sensitivity of Infrared Spectroscopy by the Application of Least Squares Methods," Applied Spectroscopy 34, 539–548 (1980).

D. M. Haaland and R. G. Easterling, "Application of New Least Squares Methods for the Quantitative Infrared Analysis of Multicomponent Samples," Applied Spectroscopy 36, 665–673 (1982).

(List continued on next page.)

*Primary Examiner*—Marc S. Hoff
*Assistant Examiner*—Edward Raymond
(74) *Attorney, Agent, or Firm*—Kevin W. Bieg

(57) ABSTRACT

An improved classical least squares multivariate spectral analysis method that adds spectral shapes describing non-calibrated components and system effects (other than baseline corrections) present in the analyzed mixture to the prediction phase of the method. These improvements decrease or eliminate many of the restrictions to the CLS-type methods and greatly extend their capabilities, accuracy, and precision. One new application of PACLS includes the ability to accurately predict unknown sample concentrations when new unmodeled spectral components are present in the unknown samples. Other applications of PACLS include the incorporation of spectrometer drift into the quantitative multivariate model and the maintenance of a calibration on a drifting spectrometer. Finally, the ability of PACLS to transfer a multivariate model between spectrometers is demonstrated.

30 Claims, 16 Drawing Sheets

OTHER PUBLICATIONS

A. Lorber, Error Propagation and Figures of Merit for Quantification by Solving Matrix Equations, Anal. Chem. 58 1167 (1987).

D. M. Haaland and D. K. Melgaard, "New Prediction–Augmented Classical Least Squares (PACLS) Methods: Application to Unmodeled Interferents," submitted to Appl. Spectrosc. (Feb. 2000).

"Multivariate Calibration Based on the Linear Mixture Model" pp. 167–214.

D. M. Haaland, "Methods to Include Beer's Law Nonlinearities in Quantitative Spectral Analysis," in ASTM Special Technical Publication, *Computerized Quantitative Infrared Analysis*, G. L. McClure, Editor, STP 934, 78–94 (1987).

H. Martens and T. Naes, "Multivariate Calibration by Data Compression," in Near–infrared Technology in Agricultural and Food Industries, Ed. P, C. Williams and K. Norris, Am. Assoc. Cereal Chem. St. Paul Minnesota, 57–87 (1987).

"Orthogonal Decomposition in Certain Elementary Orthogonal Transformations," pp. 9–17.

W. Windig, "Spectral data files for self–mideling curve resolution with examples using the SIMPLISMA approach," Chemom. and Intell. Lab. Syst. 36, 3–16, 1997.

R. Tauler, A. Smilde, and B. Kowalski, "Selectivity, Local Rank, Three–Way Data Analysis and Ambiguity in Multivariate Curve Resolution," J. Chemom. 9, 31–58, 1995).

J. W. Boardman, F. A. Kruxe & R. O. Green, "Mapping Target Signatures Via Partial Unmixing of a Viris Data," pp. 23–26.

D. M. Haaland, L. Han, and T. M. Niemczyk, "Enhancing IR Detection Limits for Trace Polar Organics in Aqueous Solutions with Surface–Modified Sol–gel–coated ATR Sensors," Applied Spectroscopy 53, 390–395 (1999).

D. M. Haaland and E. V. Thomas, "Partial Least–Squares Methods for Spectral Analyses. 2. Application to Simulated and Glass Spectral Data," 1988.

D. M. Haaland, "Quantitative Infrared Analysis of Borophophosilicae Films Using Multivariate Statistical Methods," 1988.

E. V. Thomas and D. M. Haaland, "Comparison of Multivariate Calibration Methods for Quantitative Spectral Analysis," 1990.

* cited by examiner

- CLS model: $a = c\hat{K} + e_a$
- CLS prediction: $\hat{c} = a\hat{K}^T(\hat{K}\hat{K}^T)^{-1}$ $$[\hat{c}_1 \; \hat{c}_2 \; \hat{c}_3 \; \hat{c}_4 \; \hat{c}_5 \; \hat{c}_6 \; \hat{c}_7] = \{\cdots\}\{\cdots\}$$

$$\hat{c} = a \cdot \hat{K}^T$$

Figure 15

CLASSICAL LEAST SQUARES MULTIVARIATE SPECTRAL ANALYSIS

CROSS-REFERENCE TO RELATED APPLICATIONS

This application is related to SD-6256 "Hybrid Multivariate Spectral Analysis Methods" filed of even date with this application and previously filed as provisional application Ser. No. 60/123,114. The present application was previously filed as provisional application 60/123,020 on Mar. 4, 1999. +gi

STATEMENT REGARDING FEDERALLY SPONSORED RESEARCH

This invention was made with Government support under Contract DE-AC04-94AL85000 awarded by the U.S. Department of Energy. The Government has certain rights in the invention.

BACKGROUND OF THE INVENTION

This invention relates to classical least squares (CLS) multivariate spectral analysis methods. More particularly, this invention relates to an improvement to the prediction phase of the CLS method wherein the spectral shapes of constituents or other factors that were not measured in the calibration data set are added to the prediction data set prior to conducting the least squares prediction of at least one of the members of the measured calibration data set found in the prediction data set.

The basic descriptions of the standard CLS methods (also called linear unmixing models and K-matrix methods) are described in many references, see D. M. Haaland and R. G. Easterling, "Improved Sensitivity of Infrared Spectroscopy by the Application of Least Squares Methods," Applied Spectroscopy 34, 539–548 (1980); D. M. Haaland and R. G. Easterling, "Application of New Least Squares Methods for the Quantitative Infrared Analysis of Multicomponent Samples," Applied Spectroscopy 36, 665–673 (1982); D. M. Haaland, R. G. Easterling, and D. A. Vopicka, "Multivariate Least-Squares Methods Applied to the Quantitative Spectral Analysis of Multicomponent Samples," Applied Spectroscopy 39, 73–84 (1985); and D. M. Haaland, "Methods to Include Beer's Law Nonlinearities in Quantitative Spectral Analysis," in ASTM Special Technical Publication, *Computerized Quantitative Infrared Analysis*, G. L. McClure, Editor, STP 934, 78–94 (1987). CLS multivariate calibration methods have been hampered by the general restriction that the functional form of all sources of spectral variation in the calibration samples be known and included in the CLS analysis. This restriction has limited the widespread use of CLS methods relative to the less restrictive methods of partial least squares (PLS) and principal component regression (PCR) (see for example D. M. Haaland and E. V. Thomas, "Partial Least-Squares Methods for Spectral Analyses 1: Relation to Other Multivariate Calibration Methods and the Extraction of Qualitative Information," Analytical Chemistry 60, 1193–1202 (1988)). From another reference by the inventor herein (D. M. Haaland, L. Han, and T. M. Niemczyk, "Use of CLS to Understand PLS IR Calibration for Trace Detection of Organic Molecules in Water," Applied Spectroscopy 53, 390–395 (1999)) one may obtain a description of the standard classical least squares (CLS) calibration method. If one writes the linear additive equations (e.g., Beer's law equations) in matrix form, the CLS model can be expressed as:

$$A = KC + E_A \quad \text{Eq. (1)}$$

where A is a p×n matrix of measured p absorbance intensities for n sample spectra (i.e., in this case the spectra are the columns of the spectral matrix), K is a p×m matrix of the m pure-component spectra of all spectrally active components in the samples, C is the m×n matrix of concentrations for the m components in the n samples, and $E_A$ is the p×n matrix of spectral errors in the model. The linear least squares solution for K for the model in Eq. 1 from a series of calibration samples with known component concentrations is $$\hat{K} = AC^T(CC^T)^{-1} \approx AC^+ \quad \text{Eq. (2)}$$

where $\hat{K}$ is the linear least squares estimate of the m pure-component spectra K and $C^+$ is the pseudoinverse of C. A variety of methods, including singular value decomposition or QR decomposition (C. L. Lawson and R. J. Hanson, *"Solving Least Squares Problems,"* Prentice-Hall, Englewood Cliffs, N.J. (1974)) can be employed to improve the numerical precision of the solution to the pseudoinverse in Eq. (2). Therefore, the CLS calibration decomposes the spectral data into a set of basis vectors that are chemically relevant and readily interpretable. If all component concentrations are known for the calibration samples and these components are the only source of spectral change, then CLS yields least-squares estimates of the pure-component spectra as the components exist in the sample matrix over the concentration range of the calibration samples. These pure-component spectra will include linear approximations of interactions between molecules if they are present in the calibration spectra. The CLS calibration model has generally included only spectrally active chemical components. However, it is also possible to include other sources of spectral variation present in the spectra that are not due to changes in the chemical compositions of the samples. Examples of additional sources of spectral variation that might be added to the CLS calibration include changes in purge gas $H_2O$ and $CO_2$ concentrations, spectral changes in the sample spectra that represent spectrometer drift, and optical insertion effects. A Beer's law drift component can be included in the CLS calibration if the drift is linearly related to some parameter that can be measured.

The CLS prediction uses the same model in Eq. 1 that was used for CLS calibration. The least-squares solution for the component concentrations of one or more sample spectra is given by $$\hat{C} = (\hat{K}^T\hat{K})^{-1}\hat{K}^T A \approx \hat{K}^+ A \quad \text{Eq. (3)}$$

where now A represents the spectral matrix of the samples to be predicted and $\hat{K}^+$ represents the pseudoinverse of $\hat{K}$.

BRIEF SUMMARY OF THE INVENTION

A method for performing an improved classical least squares multivariate estimation of the quantity of at least one constituent of a sample comprising first utilizing a previously constructed calibration data set expressed as matrix $\hat{K}$ representing the combination of vectors expressing the spectral shapes and concentrations of the measured pure sample constituents of the calibration data set, measuring the response of the sample that contains the constituents in the calibration data set as well as additional constituents and additional system effects not present in the calibration data set to form a prediction data set, adding at least one vector expressing the spectral shape (but not concentration) of at least one additional constituent or additional system effect not present in the calibration data set but present in the prediction data set to form an augmented matrix ˜K, and estimating the quantity of at least one of the constituents in the calibration data set that is present in the sample by utilizing the augmented matrix ˜K.

There is a wide variety of constituents and system effects that can be added during the prediction (estimation) phase of the classical least squares (CLS) analysis. Chemicals that were omitted from the calibration data set can be added as spectral shapes to form the augmented matrix. Other candidates for admission include but are not limited to spectrometer drift, temperature effects, optical changes due to sample insertion variations, shifts between spectrometers, differences in the chemicals in the calibration data set and their very close analogs present in the sample, chromatic aberrations, diffraction effects and nonlinearities present in the calibration samples. Addition of spectral shapes for baseline corrections has been known for some years now and is not part of this invention.

BRIEF DESCRIPTION OF THE SEVERAL VIEWS OF THE DRAWING

FIG. 15 gives the PACLS prediction model and solution along with a graphical representation of the method by which the spectral shapes are added during PACLS prediction.

DETAILED DESCRIPTION OF THE INVENTION

Figure 1:
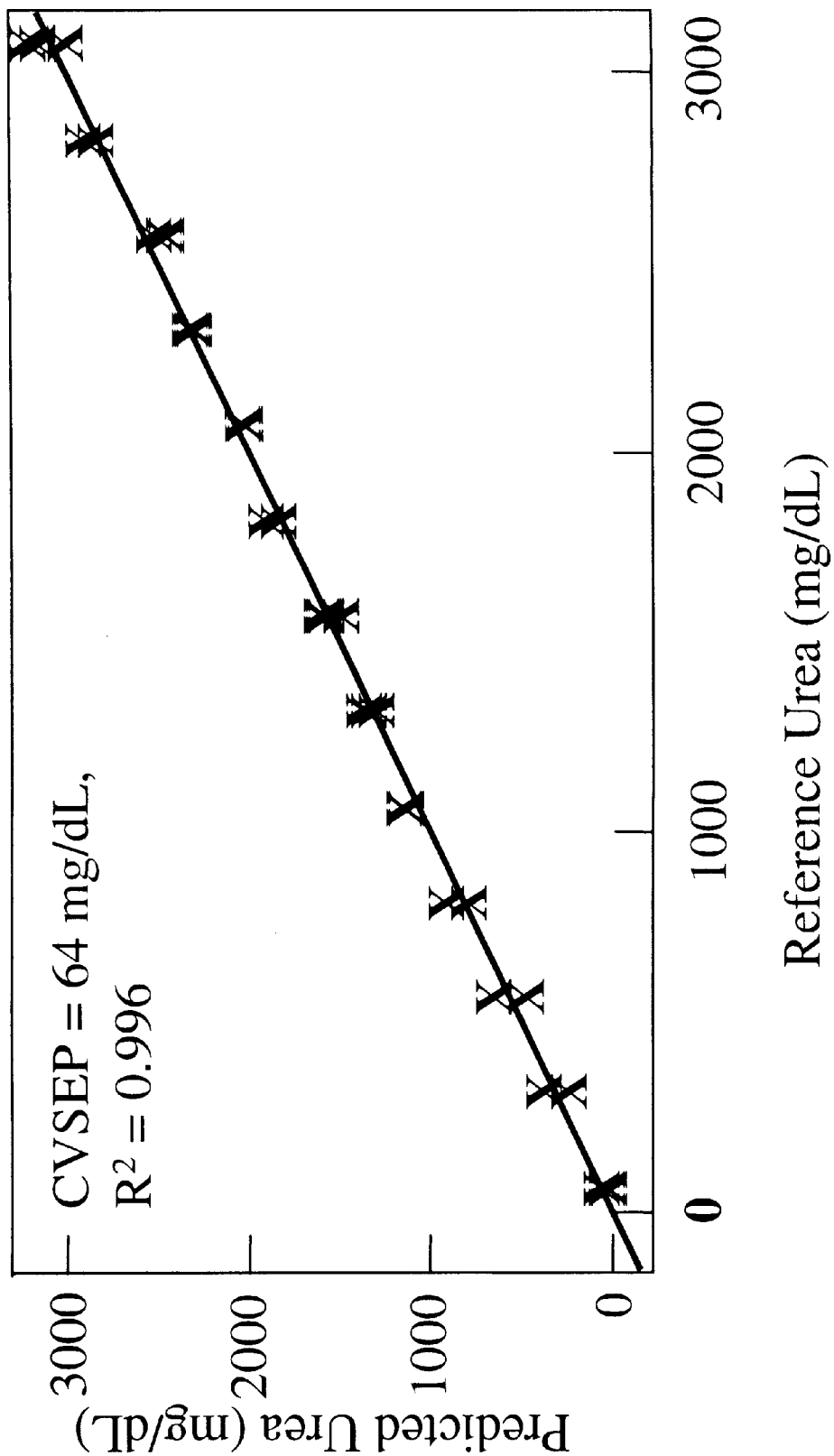
FIG. 1 is a graph showing cross-validated CLS predictions for urea in the 31 dilute aqueous calibration samples run at a constant temperature of 23° C. wherein the line of identity is also presented in this and all subsequent prediction plots.

The prediction-augmented classical least-squares (PACLS) method described here is useful when all the sources of spectral variation in the spectral region being analyzed are not known during the calibration phase of the CLS analysis. In this case of inadequate calibration information, the exclusion from the calibration of spectral component concentrations or other parameters that cause spectral changes in the samples will result in estimated pure-component spectra that are contaminated by the presence of the excluded spectral components. The use of these contaminated pure-component spectra during the CLS prediction will cause the prediction errors to be larger relative to a CLS analysis that included representations of all sources of spectral variation in the CLS calibration. The new PACLS algorithm allows for spectral shapes of components that were left out of the calibration to be added during CLS prediction in order to compensate for the absence of any spectral components during the CLS calibration. The only requirement for the PACLS algorithm is that important spectral components left out of the CLS calibration have their shapes or linear combinations of their shapes identified and included during the CLS prediction phase of the analysis. In this case, the PACLS algorithm uses the same equations as the CLS algorithm except that during CLS prediction, the $\hat{K}$ matrix in Eq. 3 is augmented with columns representing the spectral shapes of those spectral components that were not included in the CLS calibration. If $\tilde{K}$ represents the augmented spectral shape matrix with spectral shapes added as columns in the original $\hat{K}$ matrix, then the PACLS prediction becomes $$\hat{C} = (\tilde{K}^T \tilde{K})^{-1} \tilde{K}^T A \approx \tilde{K}^+ A \qquad \text{Eq. (4)}$$

Linear baseline spectral components were added to simultaneously remove the effects of linear baseline variations (see: D. M. Haaland and R. G. Easterling, "Improved Sensitivity of Infrared Spectroscopy by the Application of Least Squares Methods," Applied Spectroscopy 34, 539–548 (1980), D. M. Haaland and R. G. Easterling, "Application of New Least Squares Methods for the Quantitative Infrared Analysis of Multicomponent Samples,"

Applied Spectroscopy 36, 665–673 (1982), D. M. Haaland, R. G. Easterling, and D. A. Vopicka, "Multivariate Least-Squares Methods Applied to the Quantitative Spectral Analysis of Multicomponent Samples," Applied Spectroscopy 39, 73–84 (1985), D. M. Haaland, "Methods to Include Beer's Law Nonlinearities in Quantitative Spectral Analysis," in ASTM Special Technical Publication, *Computerized Quantitative Infrared Analysis*, G. L. McClure, Editor, STP 934, 78–94 (1987), and D. M. Haaland, L. Han, and T. M. Niemczyk, "Use of CLS to Understand PLS IR Calibration for Trace Detection of Organic Molecules in Water," Applied Spectroscopy 53, 390–395 (1999)). Four references also describe the addition of higher order polynomial baselines or other functional forms of the baseline to the CLS prediction (see: D. M. Haaland, "Methods to Include Beer's Law Nonlinearities in Quantitative Spectral Analysis," in ASTM Special Technical Publication, *Computerized Quantitative Infrared Analysis*, G. L. McClure, Editor, STP 934, 78–94 (1987), D. M. Haaland, "Multivariate Calibration Methods Applied to Quantitative FT-IR Analyses," Chapter 8 in *Practical Fourier Transform Infrared Spectroscopy*, J. R. Ferraro and K. Krishnan, Editors, Academic Press, New York, pp. 396–468, (1989), P. Saarinen and J. Kauppinen, "Multicomponent Analysis of FT-IR Spectra," Applied Spectroscopy 45 953–963 (1991), and P. Jaakkola, J. D. Tate, M. Paakkunainen, J. Kauppinen, and P. Saarinen, Applied Spectroscopy 51 1159–1169 (1997)). The P. Saarinen reference also discusses adding spectral information on purge-gas components to the CLS prediction. This reference, however, only discusses the CLS prediction using pure-component spectra measured directly and does not mention estimating the pure-component spectra from a CLS calibration. It is not apparent in any of these references that any of the authors were aware that spectral components left out of the CLS calibration could be added during CLS prediction as spectral shapes to mitigate the detrimental effects of contaminated CLS estimated pure-component spectra and to correct resulting errors in the CLS prediction. This realization that errors resulting from spectral components left out of the CLS calibration could be corrected during CLS prediction by adding their spectral shapes is the basis of the PACLS method that is disclosed in this patent application for quantitative spectral analysis.

Martens and Naes have previously proposed a similar approach to accommodate the effects of an inadequately specified CLS calibration (see H. Martens and T. Naes, "Multivariate Calibration by Data Compression," in Near-infrared Technology in Agricultural and Food Industries, Ed. P, C. Williams and K. Norris, Am. Assoc. Cereal Chem. St. Paul Minnesota, 57–87 (1987) and Martens and Naes, Multivariate Calibration, John Wiley & Sons, New York, 191–202 (1989)). However, they advocate using spectral shapes generated from an eigenvector decomposition of the spectral residuals from an inadequately specified CLS calibration model. These eigenvectors are then added in the CLS prediction. However, we do not obtain our spectral shapes from an eigenvector decomposition of the calibration spectral residuals. Rather the spectral shapes are obtained independent from the calibration data or they are based upon spectral shapes generated by augmenting the calibration concentration matrix with concentration terms other than strictly linear concentrations. Our approach is more general. The PACLS method disclosed here can be used for any quantitative spectral analysis independent of the type of spectroscopy used. In addition, the methods are not restricted to linear additive models. These methods can be used in any spectroscopy where the spectral data are related to the parameters of interest by some known or approximated functional form. Types of spectroscopy where these methods might be used include, but are not restricted to, 1) infrared, 2) near-infrared, 3) visible, 4) ultraviolet, 5) X-ray, 6) gamma-ray, 7) Raman, 8) mass spectroscopy, 9) ion-mobility mass spectroscopy, 10) Auger, 11) fluorescence, 12) phosphorescence, 13) ESCA, 14) far-infrared, 15) microwave, 16) x-ray fluorescence, 17) NMR, 18) energy loss spectroscopy, 19) EDAX, 20) ESR, and 21) multi- and hyper-spectral imaging spectroscopy. These spectroscopic methods can be used in absorption, transmission, reflection, or emission modes. In addition, these methods can be applied to other forms of multivariate data such as seismic data, chromatographic data, thermal gravimetric analysis, and image data. The PACLS method can also be used for outlier or anomaly detection by examining various outlier metrics such as Mahalanobis distance, spectral residuals, spectral F ratios, or other statistical indications of spectra that lie outside the PACLS model. This additional capability is ideally suited for multi- and hyperspectral image analysis. With the outlier metrics obtained from PACLS, the PACLS method can also be used for classification purposes. In this discussion, CLS analysis will refer to either CLS calibration or prediction and can include the new PACLS method. In addition, spectral components can include either chemical components (molecular or elemental) or any other source of spectral change that include but are not limited to spectrometer/system drift, temperature changes, sample insertion and alignment effects, purge changes, alignment changes, detector changes and nonlinearities, source changes, and changes in spectrometer components to include even substitution of whole spectrometers.

The PACLS method is also ideally suited for general quantitative multi- and hyperspectral image analysis. It is desired that the pure spectra be generated from the spectral analysis of the spectral images using any one of a variety of methods of determining purecomponent spectra from the spectral images (e.g., pixel purity index, see J. W. Boardman, F. A. Kruse, and R. O. Green, "Mapping target signatures via partial unmixing of AVIRIS data: in Summaries," Fifth JPL Airborne Earth Science Workshop, JPL Publication 95-1, v. 1, p. 23–26, 1995, SIMPLISMA, see W. Windig, "Spectral data files for self-mideling curve resolution with examples using the SIMPLISMA approach," Chemom. and Intell. Lab. Syst. 36, 3–16, 1997, or various methods of multivariate curve resolution (MCR), see R. Tauler, A. Smilde, and B. Kowalski, "Selectivity, Local Rank, Three-Way Data Analysis and Ambiguity in Multivariate Curve Resolution," J. Chemom. 9, 31–58, 1995). However, if sources of future spectral variation are either not present or are present at a constant level in the images, then the pure component spectral estimates from the image will not be adequately defined for future CLS-type predictions. Independent measures of the potential interfering spectra (or linear combinations of them) can be added in a PACLS analysis of the spectral image data. Sources of spectral variation that may not be adequately included in the pure-component spectral estimates include but are not limited to, purge or atmospheric variations, spectrometer drift, view angle changes, chromatic aberration, or any spectral component that is not in the calibration image(s) but may be present in the prediction image. Thus, Satellite multi- and hyperspectral imaging is an important potential beneficiary of the PACLS algorithm. In fact, the use of multi- and hyperspectral imaging can have a very beneficial impact on the scanning of microarrays for studying the expression of genes. In the current microarray scanning technology, univariate measurements of fluorescence are used in a scanning mode to identify and quantify the fluorescence tags of hybridized gene fragments on the microarray slides. Performing multi- or hyperspectral imaging of the fluorescence signals on the microarray can increase sensitivity, speed, accuracy, reliability, and the numbers of fluorescence tags that can be simultaneously monitored on the microarray slide. The hybrid algorithm is ideally suited to perform this analysis and can be used to minimize or even eliminate the detrimental influences of stray light and contaminant and substrate fluorescence on the quantitative analyses.

In correcting for chromatic aberrations, linear estimates of the pure-component spectra of the aberrations can be determined from the difference between the spectra from a homogeneous region and the spectra at the edges of the homogeneous region. If the functional form of the aberrations are known, then these functions can be used to obtain pure-component spectra of the aberrations that are better than the linear approximations described above.

Normally, in CLS calibration, all significant sources of spectral variation in the spectral region being analyzed should be included in the calibration in order for accurate calibration models to be obtained. This means that all component concentrations of spectrally significant components should be known for the calibration data (except in the case of mixture systems where the sum of spectrally active components is unity, where all but one of the components must be known). This requirement could be relaxed somewhat if the spectra are analyzed separately in multiple spectral windows or regions as described in D. M. Haaland and R. G. Easterling, "Application of New Least Squares Methods for the Quantitative Infrared Analysis of Multicomponent Samples," Applied Spectroscopy 36, 665–673 (1982). However, this newly disclosed method allows for known spectral shapes to be substituted for chemical composition information during the CLS analysis. The spectral components not known during calibration can still be included in the CLS prediction model if their shapes are known. Therefore, either the concentrations or the spectral shapes (derived from theory or from empirical measurements) of spectral components can be used in the CLS model. Previously, it was thought that if all spectral component concentrations were not included in the CLS calibration, then CLS would fail to yield accurate results. The CLS analysis result will, in fact, be correct for the components whose concentrations are known during the calibration if all the shapes of components whose concentrations are not known in the calibration samples are added during CLS prediction. The spectral components whose concentrations are not known during calibration, but whose shapes are known cannot generally be reliably predicted if these shapes vary in the calibration spectra. The reason that spectral shapes can be substituted for concentration information is that the netanalyte signal (NAS) (see A. Lorber, Anal. Chem. 58 1167 (1986)) for the concentration components is unaffected by the substitution of shapes used in prediction for concentrations. A mathematical proof of this statement is presented in D. M. Haaland and D. K. Melgaard, "New Prediction-Augmented Classical Least Squares (PACLS) Methods: Application to Unmodeled Interferents," submitted to Appl. Spectrosc. (February 2000), the contents of which paper are incorporated herein by reference in its entirety. The NAS is that portion of the analyte signal that is orthogonal to all other sources of spectral variation and is the only portion of the analyte signal that is available for analysis. Note that spectral shapes can include the cases where the spectral intensities are intermittent or even scrambled in frequency or wavelength space. The only requirement is that all calibration spectra, prediction spectra, and added spectral shapes have the same ordering and correspondence of frequencies or wavelengths.

The spectral shapes to be added during cross-validated CLS calibration or during CLS prediction can be determined by a variety of methods. Here, it is assumed that the spectral shapes are a result of the presence of chemical components in the calibration or prediction samples. Later, cases will be discussed where spectral shapes are the result of factors other than molecular or elemental species. If the component shape is unaffected by matrix effects, the spectrum of the pure component can be obtained by simply measuring the spectrum of the pure component However, quite often, there are matrix effects or interactions between components. In this latter case, the spectral shapes can be obtained by spiking a representative calibration sample with a known (or even unknown) amount of the component. Then spectral differences will yield the spectral shape of the component that also includes displacement of the sample by the component. Another method to determine the spectral shape that is generally preferred is to estimate the component by CLS calibration methods by adding known amounts of the analyte to one or more calibration or known samples. The CLS calibration of this generally small set of samples will yield the desired CLS estimated pure-component spectrum to be included in the PACLS algorithm. If the data are not mean centered, the CLS calibration will yield the pure-component spectrum directly. If the data are mean centered or if an intercept is fit during the CLS calibration, then the pure-component spectrum will represent the pure component with displacement of the sample. Either pure-component spectrum can be used in the analysis if the calibration is not mean centered or an intercept is not fit since the net-analyte signal for multi-component systems in this case is not affected by the use of the either pure-component spectra or pure-component spectra with displacement. However, for mean-centered calibrations, the pure component spectral data with displacement should be used in the PACLS analysis.

If spectral shapes are due to spectrometer drift, temperature changes, purge gas changes, sample insertion effects, diffraction effects, or other sources of spectral change that are not due to the chemical components in the system, then the required spectral shapes can be determined through the use of repeat samples. The best single repeat sample is generally the sample representing the center of the calibration space. In the case of a single repeat sample, the sample spectrum of the repeat sample can be obtained during the period of the calibration. This repeat sample can then represent all the environmental changes occurring during the calibration as reflected by the mid-level sample. It is known that the drift of the spectrometer looks different on different samples. Therefore, a sample that represents the calibration data is the preferred sample to use. If the sample is invariant with time, then any change in the sample spectrum will represent spectral shapes that generally have not been explicitly included in the CLS calibration. The addition of these spectral changes to the CLS calibration model will compensate for their detrimental influence on predictions. Often it is best to perform an eigenvector analysis (see C. L. Lawson and R. J. Hanson, *Solving Least Squares Problems*," Prentice-Hall, Englewood Cliffs, N.J. (1974) on the repeat sample spectra and to add only those eigenvector shapes that are detrimental to the CLS calibration. In this manner, the detrimental effects of noise on the analysis can be minimized. In addition, it is preferable to perturb the system with all parameters that are known or suspected of influencing the sample spectra. In this manner, the influence of spectrometer/system changes can be systematically included in the PACLS analysis. It is preferred that these perturbations be performed in a statistically designed manner such as a factorial or fractional factorial design. Examples of changes for infrared and near infrared spectrometers that can be included in the perturbation are system temperature, rate of temperature change, sample temperature, sample insertion effects, source changes (intensity, lifetime, bulb changes, etc.), purge gas composition, alignment changes, etc. In addition, if the spectral changes between calibration sample spectra are large; it may be desirable to also take repeat spectra of other samples in the calibration, e.g., samples at the extreme levels of the calibration design. These repeat sample spectra should be mean centered by sample. After mean centering, the spectra can be combined, and if desired, an eigenvector analysis can be performed on all mean-centered spectra in order to select only those eigenvectors that are important for reducing errors in the CLS analysis. This procedure minimizes the effects of spectral noise from the added spectral shapes. For infrared spectra of dilute solutions, a repeat sample representing the absorbing solvent (e.g., water) can be used for the repeat sample if a calibration sample or other representative sample is not available for repeat measurements. Finally, the correction of the model for spectrometer/system drift can be obtained by collecting the repeat sample spectrum during t rue CLS prediction of unknown samples. The spectral shape of the difference of the repeat sample spectrum obtained during CLS calibration and prediction can be generated from the spectral difference of these repeat sample spectra. Again, if multiple repeat spectra are obtained or if multiple repeat samples are used for monitoring spectral drift of the system, then mean-centered differences and eigenvector analysis can be employed to generate the shapes added during CLS predictions. Repeat spectra taken as close as possible in time to the unknown sample spectrum should provide the best correction for drift of the system.

If it is desired to transfer a CLS calibration between the primary spectrometer (i.e., the spectrometer upon which the calibration was based) and a secondary spectrometer, then the spectral shapes to add to the CLS analysis can be obtained from the spectra of one or more samples obtained on both spectrometers. The mean difference between the sample spectra obtained on the two spectrometers will represent the CLS bias concentration error on the secondary spectrometer. The mean-centered spectral differences will model other spectrometer effects that decrease the precision of the analysis on the secondary spectrometer when using a CLS calibration obtained on the primary spectrometer. These spectral differences can also be used to represent and to help model spectrometer drift on the two spectrometers. Again an eigenvector analysis of the spectral differences with selection of eigenvectors can improve the quality of the prediction on the secondary instrument by minimizing spectral noise and other spectral variations that may not be important for CLS predictions.

An additional method to obtain shapes for inclusion in the new PACLS method is to collect spectra from a variety of samples that vary all spectral components not analyzed while all components to be analyzed with CLS are kept invariant at either zero or constant levels. Of course the best approach is to use experimental designs in the generation of these samples or to select the sample spectra based upon spectral extremes and obtaining a good spectral distribution. Again, eigenvector analysis and selection of eigenvectors will improve the final CLS analysis by selecting only important shapes for reducing prediction errors. If samples with components present at zero or constant concentration are not available, then an alternative method to generate the appropriate spectral shapes is to first obtain the spectral shapes of each analyte to be determined in the CLS analysis (using methods as described above) or by any other independent means including measuring the spectrum of the pure analyte directly or by using a library spectrum of the analyte. Then if the analyte spectral shapes are subtracted from the calibration spectra in their known reference concentrations, the resulting spectra represent the best estimate of the sample spectra at zero analyte concentration. The resulting difference spectra will represent linear combinations of the interfering spectral species and other effects such as nonlinearities, matrix effects, and mispecified purecomponent spectrum of the analyte. Adding these resulting difference spectral shapes directly or adding selected eigenvectors from the eigenvector decomposition of these difference spectra to the PACLS prediction will result in improved predictions.

Another application of the method occurs when the starting materials used in the CLS calibration differ from those used during preparation or generation of the prediction samples. This is a common occurrence in industry when natural products or variable starting material purity is encountered. In this case, the CLS calibration can be adapted to the changes in the starting materials by simply obtaining the starting material spectra for the calibration materials and the comparable materials used in the later CLS prediction analysis whenever the starting materials have changed. The difference spectra again represent those spectral differences that were not included in the original calibration. The inclusion of these shapes in the prediction phase of the CLS analysis should compensate for these unmodeled spectral differences if the analyte concentrations do not change. If the analyte concentrations change, then these analyte concentration changes must be determined and included in the analysis.

The spectral shapes to add to the PACLS algorithm can be generated artificially. In addition to the artificial generation of baseline variations (e.g., linear, quadratic, higher order polynomials, exponential, etc.), spectral shapes due to the nonlinear effects of stray light in absorbance spectra or specular reflection in reflection-absorbance spectra can be generated and added to the PACLS analysis. In these two latter cases, various portions of the single-beam spectrum of the background can be added to the single-beam sample spectrum. These single-beam-augmented spectra are then converted to absorbance (or -log(R) for reflectance spectra). The original absorbance or reflectance spectrum is then subtracted from the series of augmented spectra. These difference spectra represent the spectral shapes of the nonlinear effects of stray light or specular reflectance. Again eigenvector analysis of these shapes should improve the signal-to-noise of the added shapes.

Artificial methods can also be used to simulate the effects of non-linear detector response. For example, in Fourier transform infrared (FT-IR) spectroscopy, nonlinear detector response results in single-beam spectra that are displaced lower in intensity relative to a linear detector. Therefore, subtracting a constant amount of intensity from all single-beam sample spectral intensities can simulate spectrometer nonlinearities. These shifted single-beam spectra are converted to absorbance. The original absorbance spectrum is then subtracted from the simulated absorbance spectrum to represent the shape of the nonlinear spectrometer response.

Generating a series of spectra in this manner can simulate linear representations of the nonlinearities. Again eigenvector analysis of these shapes should improve the signal-to-noise of the added shapes.

It is important that the linear component of the shape of the analyte of interest not be present in the spectral shapes that are added in the CLS analysis. If the spectral shapes of the analyte are present in the spectral shapes added during CLS prediction, then the resulting CLS analysis can be significantly degraded due to the loss of net-analyte signal.

It is possible that nonlinearities in the calibration samples can be included in the CLS analysis as demonstrated in D. M. Haaland, "Methods to Include Beer's Law Nonlinearities in Quantitative Spectral Analysis," in ASTM Special Technical Publication, *Computerized Quantitative Infrared Analysis,* G. L. McClure, Editor, STP 934, 78–94 (1987), which describes methods for accounting for nonlinearities in the CLS analysis. Shapes of nonlinear portions of the component spectra can be determined by assuming nonlinear functional forms for the concentration matrix during calibration. Any explicit functional form of the concentrations may be used. As an example, squared component concentrations can be added to the concentration matrix for all those components thought to experience nonlinear behavior. Concentration cross products can be added for interacting components. The CLS-estimated pure-component spectra for the squared and/or cross-product components can be included during prediction to minimize the influence of nonlinearities in the analysis. Either linear or nonlinear least squares CLS solutions to the problem can be used with the inclusion of these additional terms. Also, as described in the above reference, spectral residual shapes from the CLS analysis can be added to reduce the effects of deviations from the linear additive model (e.g., Beer's law model).

If the component spectral shape was not present in the calibration spectra but is present in the unknown sample spectrum to be predicted, then the PACLS-estimated component concentration of the added shape should be a good estimate of the added component. If this spectral shape is present and variable in the calibration spectra, then its PACLS estimated component concentration might not be reliable.

All methods previously developed for CLS should also work for PACLS. Examples of added features for CLS are weighted least squares, generalized least squares, base-line fitting, pathlength correction, multi-band analysis (i.e., spectra are separated into multiple spectral regions with CLS analysis applied separately to each spectral region and the results pooled into a final result, see D. M. Haaland and R. G. Easterling, "Application of New Least Squares Methods for the Quantitative Infrared Analysis of Multicomponent Samples," Applied Spectroscopy 36, 665–673 (1982)). It should be noted that any spectral preprocessing should be applied to the original calibration spectra, the prediction spectra, and the spectral shapes added in the PACLS method. Preprocessing steps include but are not limited to baseline correction, pathlength scaling, smoothing, derivatives, normalization, variance or auto scaling, and Fourier transforms. When pathlength scaling is performed, pathlength adjustments are normally applied by dividing the spectra by the pathlength to compensate for the intensity variations expected for pathlength changes in the individual samples. However, this procedure scales all components of the spectra equally. Not all sources of spectral variation should have this pathlength correction applied to them. Examples of spectral variation than should not be scaled include, but are not limited to, drift of the spectrometer, spectrally active purge gas components, and spectral changes external to the sample. In order to properly handle these different spectral components, the effect of pathlength scaling can be removed from the appropriate components by scaling the non-pathlength component concentrations in the CLS calibration by the inverse of the pathlength. This procedure effectively removes the effect of inappropriate scaling of the non-pathlength spectral components.

A method to select the eigenvectors to include in the PACLS prediction from any of the analyses discussed above is based upon the use of the CLS calibration model to perform a CLS prediction on the eigenvector spectral shapes. Since the eigenvectors are orthogonal basis vectors, the errors from the eigenvectors are independent. Thus, the total error variance of all the spectral shapes included in the eigenvector decomposition is the sum of the error variances of the individual errors from each eigenvector. Therefore, the eigenvectors can be selected from those that represent the largest error sources in the standard CLS calibration (or PACLS calibration if spectral shapes are included during the building of the calibration model and additional shapes are to be included during true prediction or validation). Since the NAS is also decreased by the addition of interfering spectral shapes, the influence of this decrease in NAS can also be incorporated into the selection of eigenvector shapes to include in the PACLS analysis. In this case, the eigenvectors to include in the PACLS analysis can be selected based upon the inverse of the ratio of the squared change in net-analyte signal (NAS) and squared prediction error. It should be noted that CLS and PACLS can be modified to follow any functional form for relating spectra to parameters of interest. Therefore, series of spectra that represent kinetic runs where the kinetics equations are known can use CLS and PACLS methods to extract kinetic rate constants as well as component concentration information. Other effects such as the influence of pH or scattering on the data can be included in the CLS hard modeling if functional forms of the relationship between the spectra and the varying parameter are known. Outlier detection has always been an important feature of multivariate spectral analysis methods, and the hybrid algorithm shares this feature. Thus, outlier metrics such as spectral F ratio, concentration F ratio, Mahalanobis distances, and examination of concentration and spectral residuals are all possible outlier detection methods using the various new forms of the hybrid algorithm. Outlier detection significantly improves the reliability of the analysis with the hybrid algorithm.

Demonstration of PACLS with Several Spectroscopic Applications

Prediction-augmented classical least squares (PACLS) can be used in a variety of spectroscopic applications. For example, PACLS can be used to compensate for the presence of known but unquantified spectral components in the calibration data (i.e., the shape of the spectral component is known or can be determined, but its concentration in the calibration samples is unknown).

PACLS can also be used to compensate for unmodeled spectral components that are present in the prediction samples but that were not present in the calibration samples. An example of PACLS accommodating unmodeled components can be found in spectral data collected from a series of calibration samples consisting of multicomponent mixtures of dilute aqueous samples. The experimental details for this system can be found in D. M. Haaland and H. D. T. Jones, "Multivariate Calibration Applied to Near-Infrared Spectroscopy for the Quantitative Analysis of Dilute Aqueous Solutions," 9th International Conference on Fourier Transform Spectroscopy, J. E. Bertie and H. Wisser, Editors, Proc. SPIE Vol. 2089, pp. 448–449 (1993). Basically, the 31 calibration samples were prepared in a Latin-Hypercube experimental design with urea, creatinine, and NaCl varying in the range from 0 to ~3000 mg/dL in water. The concentrations were corrected for displacement of the water solvent. The near infrared spectra (7500–11000 $cm^{-1}$) of the samples in 10-mm pathlength cuvettes were obtained with a Nicolet 800 Fourier transform infrared (FT-IR) spectrometer. The samples were temperature equilibrated with stirring to 23° C. with the use of a Hewlett-Packard Peltier temperature controller that includes the capability of using magnetic stirring. After preparation, the sample solutions were sealed along with a small Teflon-coated magnetic stirring bar in the cuvettes using a glass cover slip and optical cement. The sample spectra were obtained in random run order operating the spectrometer at a nominal 16 $cm^{-1}$ resolution and signal averaging 256 interferograms. The spectrometer source was a 75 W tungsten-halogen lamp, the beamsplifter was made of quartz, and the detector was a liquid-nitrogen-cooled InSb detector. Several days later, the near-infrared spectra of the same set of samples were obtained with each sample temperature controlled to randomly selected 1° C. intervals from 20 to 25° C. In addition, 11 spectra of pure water were obtained in 10-mm cuvettes that were also randomly equilibrated in 0.5° C. intervals from 20 to 25° C.

A standard cross-validated CLS calibration was performed on the 31 calibration samples obtained at 23° C. In addition to the concentrations of urea, creatinine, NaCl, and water, run order was included in the CLS calibration to approximate the effects of instrument drift. Since the spectra were obtained at constant time intervals, run order approximately represents time of sample collection. Also, the drift of the system was relatively monotonic with time, so this procedure compensates for some of the detrimental effects of linear system drift on the CLS calibration. During CLS prediction in the cross validation procedure, an offset, linear slope, and quadratic curvature (i.e., a quadratic baseline) were simultaneously fit along with the CLS-estimated pure-component spectra of the four molecular components and drift spectral component shape. A cross-validation procedure was performed excluding one sample at a time. The CLS cross-validated predictions for urea are presented in FIG. 1. In this figure, CVSEP is the cross-validated standard error of prediction and $R^2$ is the cross-validated squared correlation coefficient for the calibration.

Figure 2:
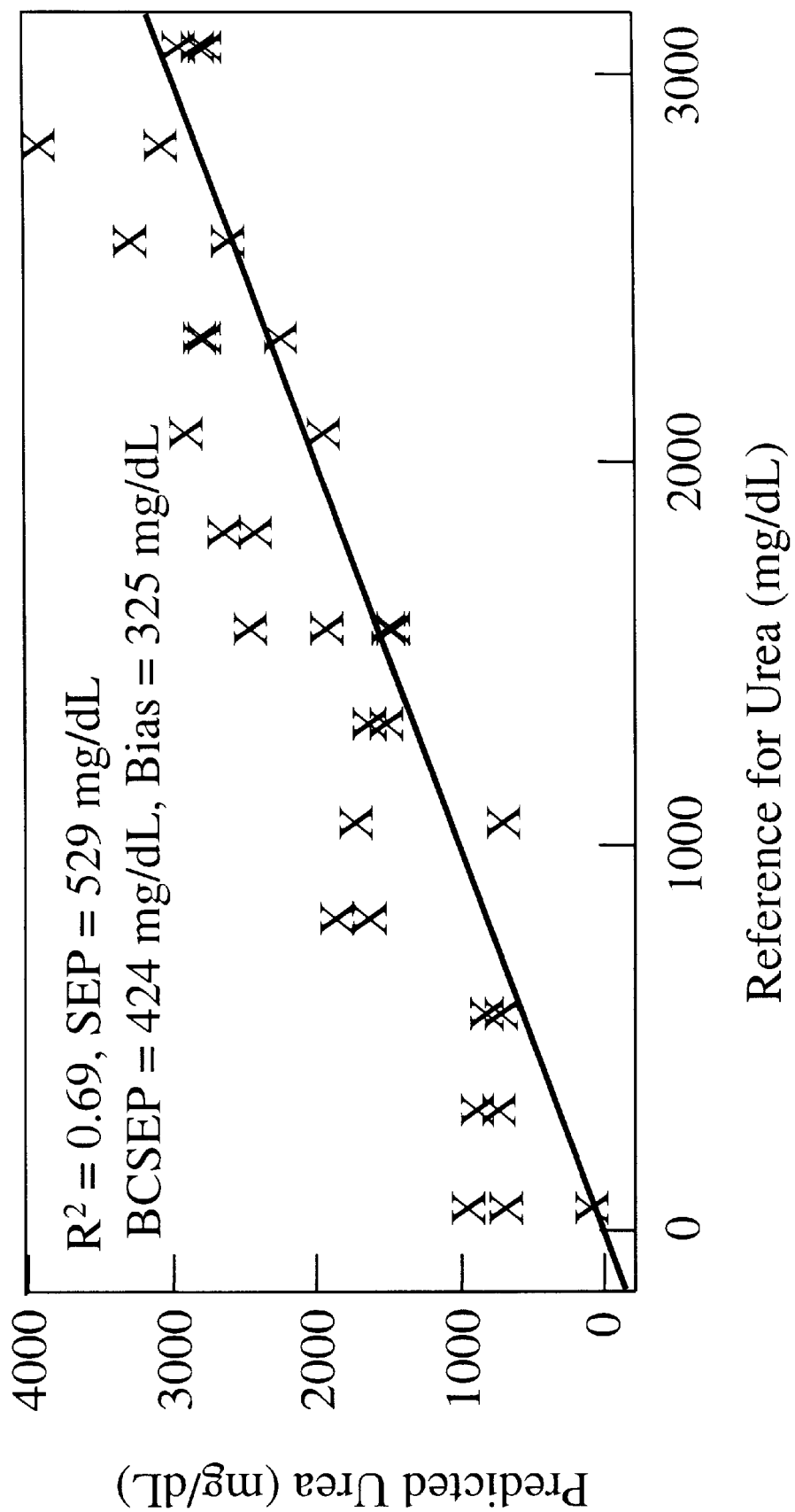
FIG. 2 is a graph of urea CLS predictions obtained when applying the constant-temperature CLS model to variable-temperature solution spectra.

This CLS model was then used in the prediction of the variable temperature sample spectra. The constant-temperature CLS model was used to obtain predictions for the urea component in the variable temperature spectra. The results of these CLS predictions are presented in FIG. 2. In this figure, SEP is the standard error of prediction, BCSEP is the bias-corrected SEP, and $R^2$ is the squared correlation coefficient for the prediction of urea.

Figure 3:
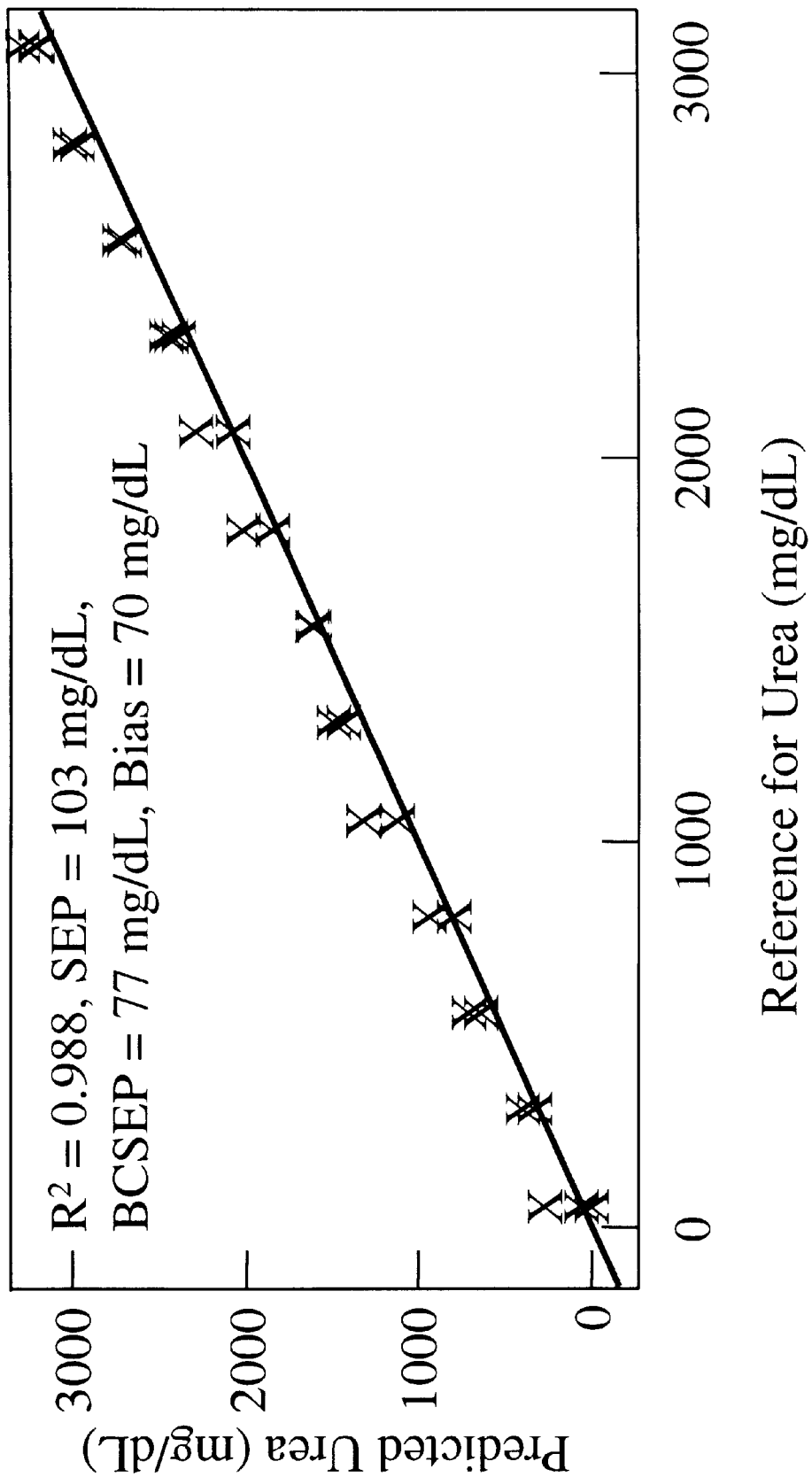
FIG. 3 is a graph of urea PACLS predictions obtained when applying the constant-temperature CLS model plus the pure-component spectral shape of water to variable-temperature solution spectra.

These urea concentration predictions are degraded both by the presence of the unmodeled temperature component and the effects of unmodeled spectrometer drift that occurs during and between each set of experiments. If the shape of the pure-component of temperature obtained during CLS calibration of the 11 variable temperature water spectra is added to the PACLS prediction, the prediction of urea improves considerably as demonstrated in FIG. 3. However, the detrimental effects of instrument drift are still present in the predictions. This instrument drift causes a bias error as well as a decrease in precision of the prediction results.

A further improvement in analysis precision can be realized if the detrimental effects of spectrometer drift can be included in the PACLS analysis. This improvement can be at least partially realized by making use of a subset of sample spectra obtained on the spectrometer during the variable temperature experiment. In this case, a subset of 5 samples representing the center-point and extreme samples in the concentration calibration space were removed from the variable temperature data set along with repeat measurement spectra of some of these same samples. These spectra were then used in a CLS calibration to estimate the 6 pure-component spectra of the 3 analytes (i.e., urea, creatinine, and NaCl), plus the water solvent, temperature, and spectrometer drift. These pure-component spectra include at least a portion of the effects of spectrometer drift between the constant and variable temperature experiments.

Figure 4:
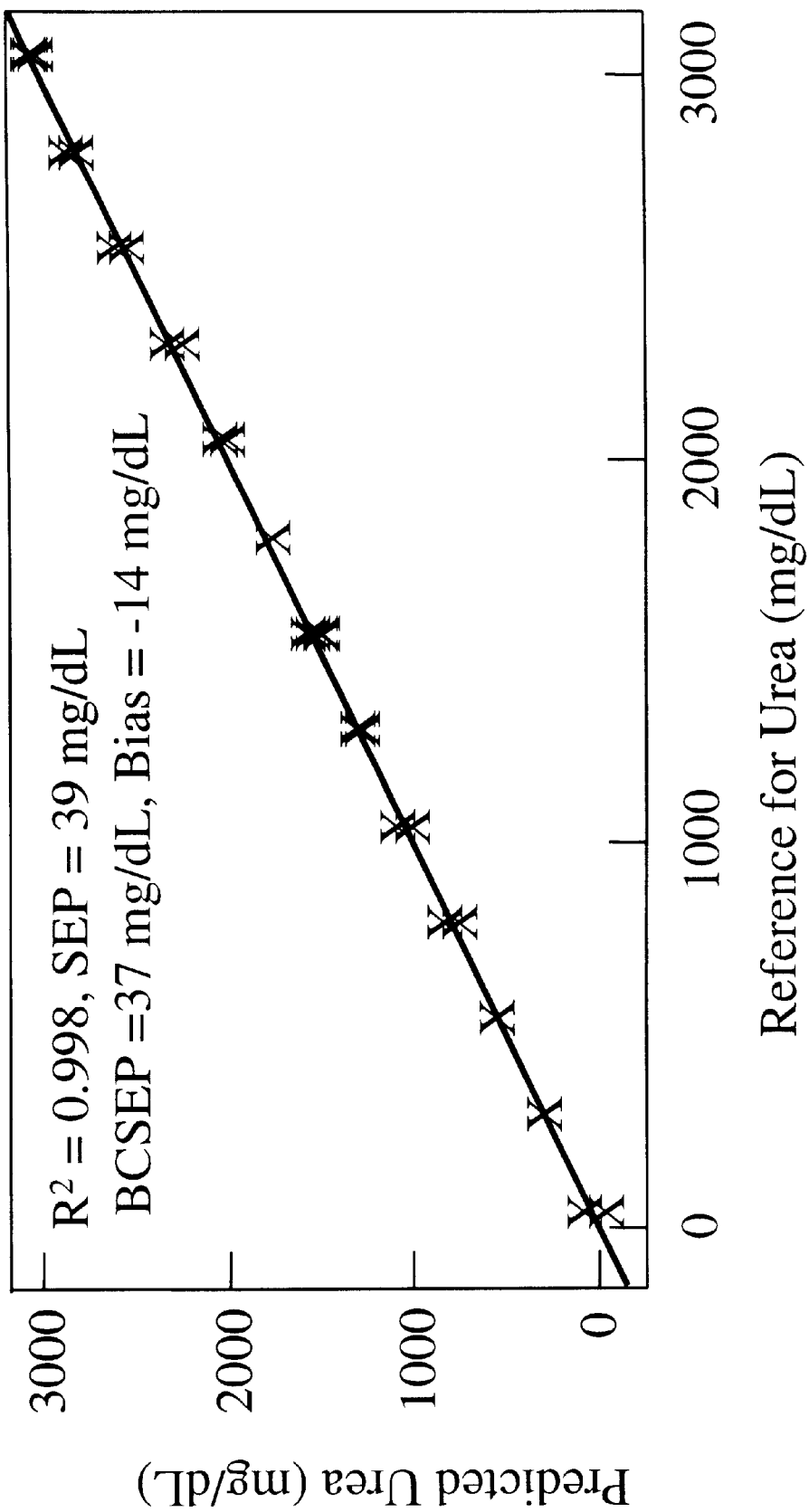
FIG. 4 is a graph of urea PACLS predictions of variable-temperature solution spectra obtained when applying the constant-temperature CLS model plus the 5 non-urea CLS-estimated pure-component spectral shapes from the variable-temperature subset samples.

The 5 CLS-estimated pure-component spectra (excluding the urea pure component) obtained from the subset of variable temperature samples were added to the PACLS prediction of the variable temperature data using the original constant temperature CLS calibration data. These PACLS prediction results for urea improve dramatically as shown in FIG. 4. In FIG. 4, the prediction on the subset of samples used for the CLS estimated pure-component spectra from the variable temperature experiment were excluded from the prediction results to eliminate the potential for overfitting of the prediction data. Similar improvements in prediction ability were achieved for all the molecular species in the samples using similar PACLS prediction procedures. In fact, in this case where temperature variation was not present in the calibration data, the PACLS prediction of temperature for the temperature varying samples can also be achieved. It is important to note that the PACLS prediction results for these variable temperature data are actually better than obtained in the CLS cross-validation for the constant-temperature data. This reduction in prediction error is the result of not only correcting for the effects of temperature variation, but also the result of including in the analysis new drift information that is contained in the spectral shapes added during the PACLS prediction. (Other methods for improving prediction results using PACLS applied to these same data are given in D. M. Haaland and D. K. Melgaard, "New Prediction-Augmented Classical Least Squares (PACLS) Methods: Application to Unmodeled Interferents," submitted to Appl. Spectrosc. (February 2000). Even better prediction precision with the PACLS method would be expected if repeat spectra had been obtained from one or more samples during the constant and variable temperature experiments. Any repeat sample spectra obtained during the calibration and prediction experiments could have served to provide a better PACLS model for the effects of instrument drift. Examples of using a repeat sample to accommodate instrument drift are presented below.

The use of PACLS to model spectrometer drift and to maintain a calibration on a drifting spectrometer can be demonstrated with infrared spectral data that are presented in L. Han, T. M. Niemczyk, and D. M. Haaland, "Enhancing IR Detection Limits for Trace Polar Organics in Aqueous Solutions with Surface-Modified Sol-Gel-Coated ATR Sensors," Applied Spectroscopy 53, 381–389 (1999) and D. M. Haaland, L. Han, and T. M. Niemczyk, "Use of CLS to Understand PLS IR Calibration for Trace Detection of Organic Molecules in Water," Applied Spectroscopy 53, 390–395 (1999). In these experiments, the infrared spectra of modified sol-gel-coated attenuated total reflectance (ATR) sensors were obtained for dilute aqueous solutions of isopropanol and acetone. These sensors improve prediction ability for the polar organic molecules by concentrating the organic molecules in the partially hydrophobic film while excluding the interfering water solvent from the film. Since the effective penetration depth of the evanescent wave is less than the thickness of the film, this new class of sensors has been demonstrated to improve infrared detection limits for organic molecules in aqueous solutions by orders of magnitude.

Figure 5A:
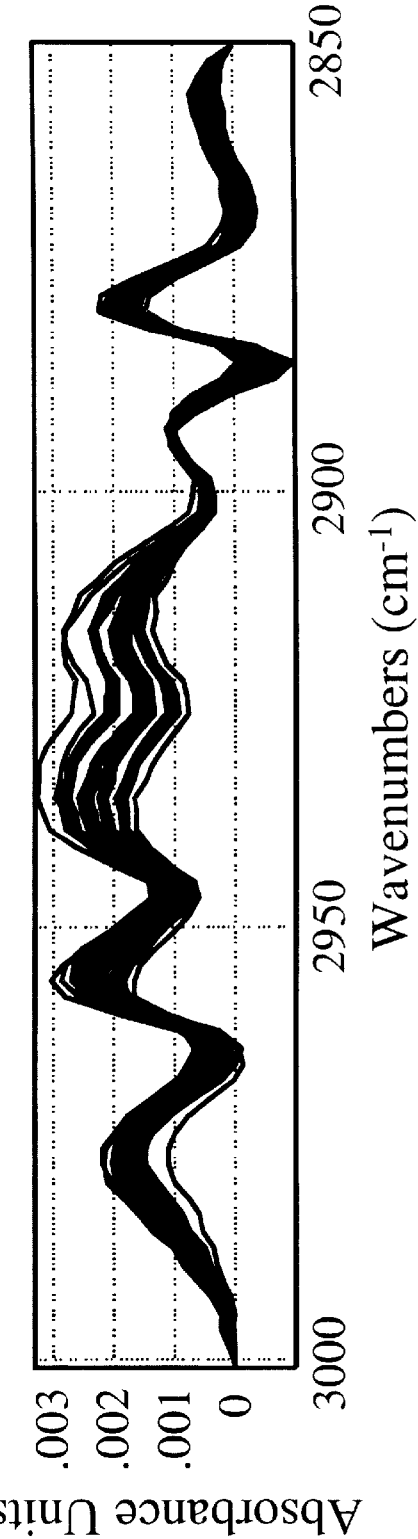
FIG. 5 is a graph showing a comparison of linear-baseline-corrected spectra of the repeat sample spectra (FIG. 5A) and the calibration sample spectra (FIG. 5B).
Figure 5B:
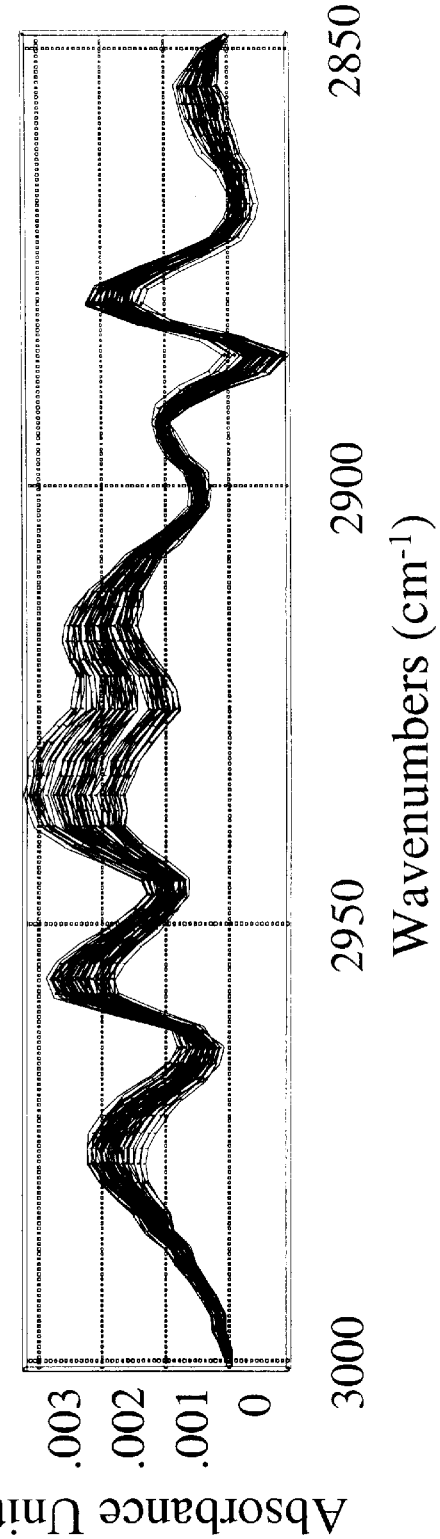

In experiments designed to test the infrared detection limits for acetone and isopropanol with the use of these new ATR sensors, it was observed that spectral variations due to spectrometer and sensor drift dominated the spectral variance of the variable composition samples. A set of calibration samples was generated based upon a 5-level, 2-factor factorial experimental design. The two factors were acetone and isopropanol concentrations that were varied at five levels from 0 to 20 parts per million (ppm) and 0 to 100 ppm for acetone and isopropanol, respectively. Repeat preparations of the center-point and 4 extreme points of the calibration concentration space were also included in the analysis. One preparation of the center-point composition was measured after every six samples by reinserting the sample into the sensor. In addition, on three occasions, ten repeat spectra of the center-point sample were obtained without removing the sample. Only the quantitative analysis of isopropanol will be reported here since it was the isopropanol C—H stretching spectral region that experienced dominant spectral effects from spectrometer/sensor drift. The linear-baseline-corrected IR spectra of the calibration samples are shown in FIG. 5B and all spectra from the center-point repeat sample are shown in FIG. 5A. Clearly the effects of system drift are dominant in these data since the total variation of the spectra appears to be comparable for both the calibration and repeat sample spectra.

Figure 6:
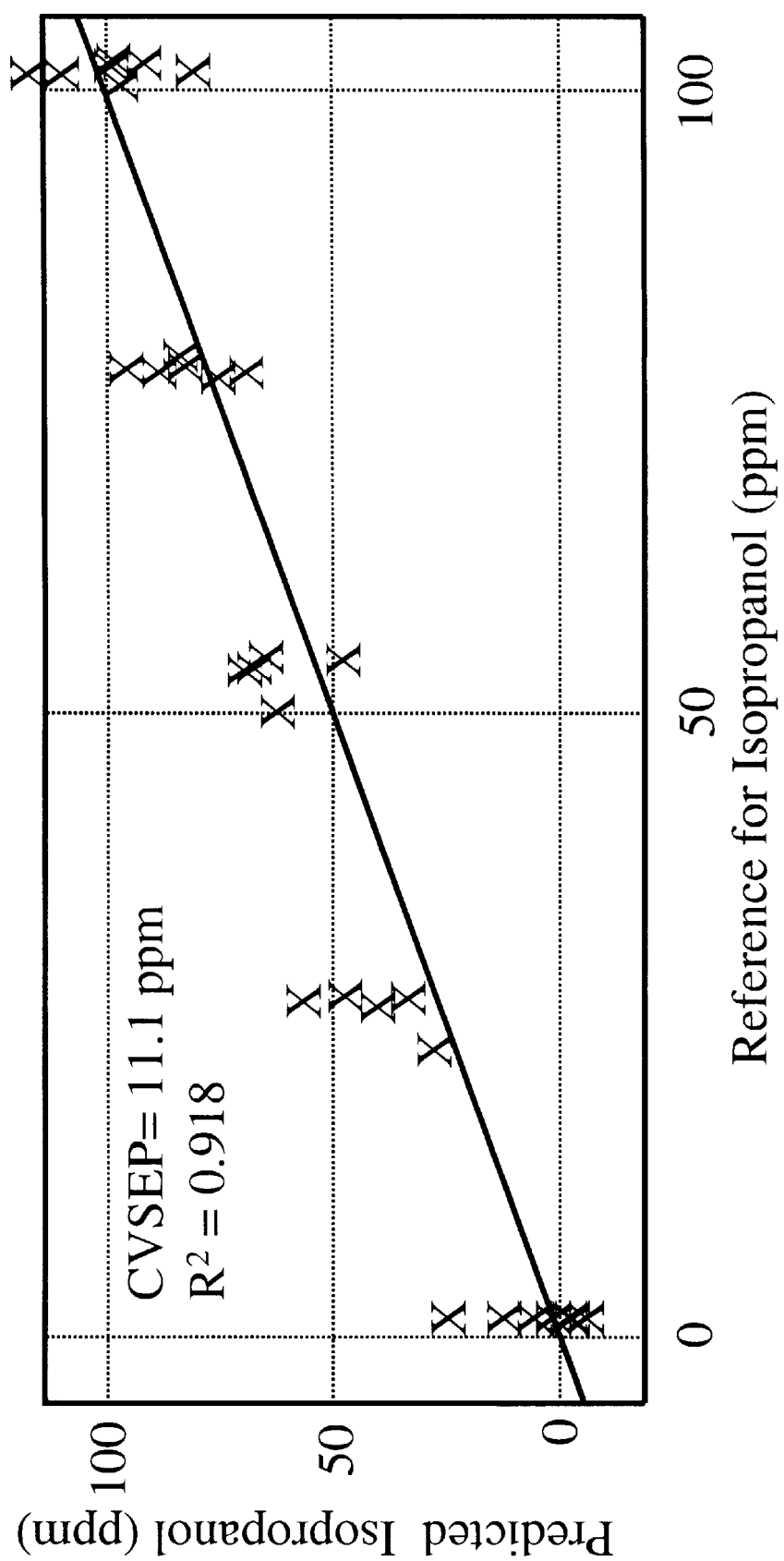
FIG. 6 is a graph of a cross-validated PLS prediction of isopropanol using all the calibration sample spectra.

The cross-validated partial least squares (PLS) calibration results for isopropanol using the calibration data are presented in FIG. 6. Here the cross-validated standard error of prediction (CVSEP) is 11.1 ppm. The corresponding cross-validated calibration using a CLS model that includes acetone and isopropanol or acetone, isopropanol, and time of data collection results in isopropanol CVSEP values of 65 and 31 ppm, respectively. This improved precision of PLS relative to CLS is generally found for condensed phase systems. In this particular case, the improvement in precision realized by PLS is due primarily to the better ability of PLS to model the very significant spectrometer/sensor drift effects that are not modeled well by CLS.

If CLS is allowed to incorporate spectrometer/sensor drift effects into the model using the new PACLS algorithm, we might expect significantly improved prediction results for the CLS-type method. The spectral shapes of spectrometer/sensor drift can be represented with the use of the center-point repeat sample spectra collected throughout this study. If the repeat sample is truly invariant over time, then the variations in the spectra must represent the spectral variations of spectrometer/sensor drift or possibly spectral effects of insertion variation of the sensor into the spectrometer and the reintroduction of the sample onto the sensor. All the repeat spectra are mean-centered (i.e., the average of the repeat spectra was subtracted from each repeat sample spectrum) to generate the spectral shapes representing spectrometer/sensor drift and sample insertion variation. All these spectral shapes (42 shapes) could be added in a cross-validated PACLS analysis. However, an improvement in prediction ability is expected if an eigenvector analysis of the mean-centered repeat spectra is performed and only the highest signal-to-noise spectral shapes are added to the PACLS analysis. In this manner, the detrimental effects of spectral noise are minimized in the PACLS analysis.

Initially, the first 8 eigenvectors were selected for inclusion in the PACLS analysis based upon a visual examination of the eigenvectors. Only the first 8 eigenvectors appeared to represent information where the spectral information exceeded the noise. Later analyses adding one eigenvector at a time confirmed that the selection of the first 8 eigenvectors was optimal for concentration prediction of isopropanol using the PACLS method.

Figure 7:
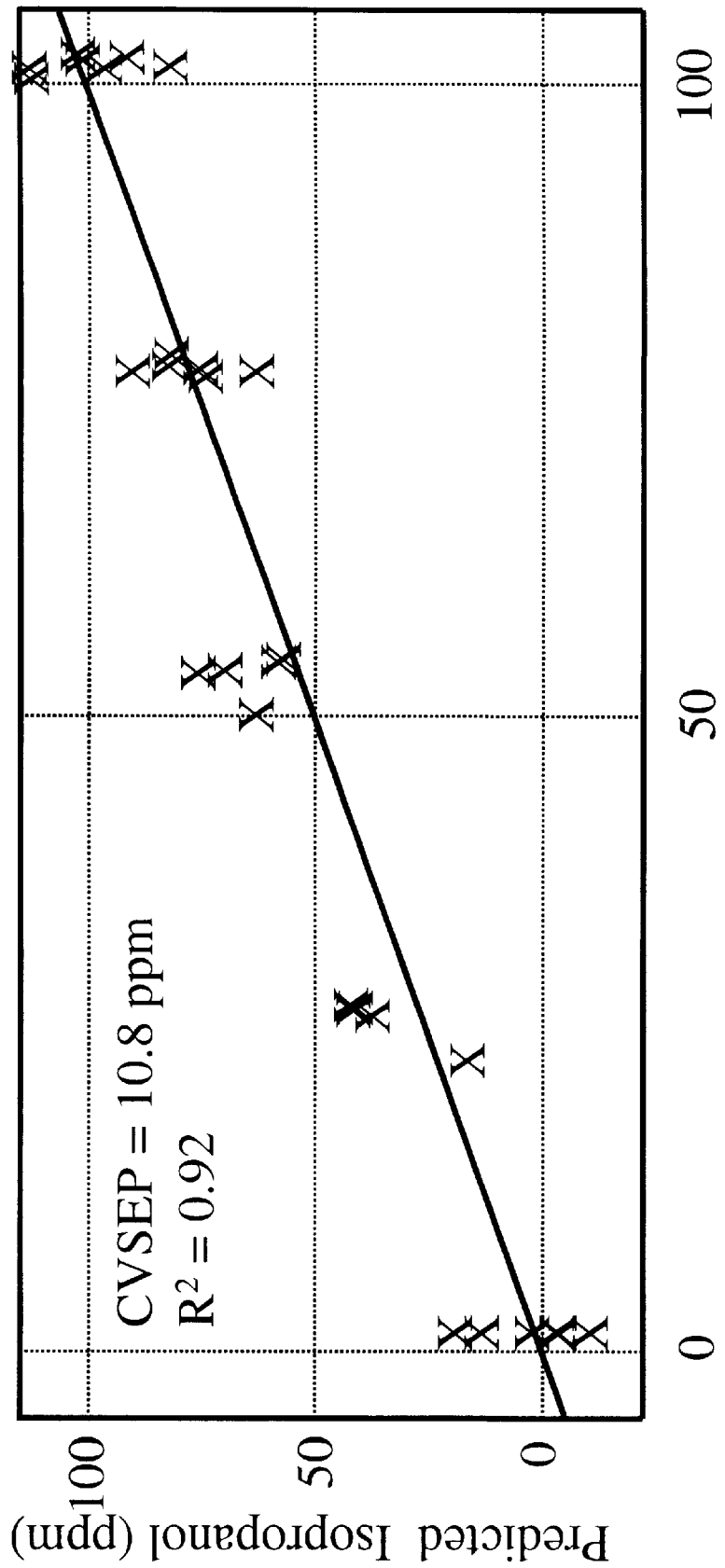
FIG. 7 is a graph of a cross-validated PACLS prediction of isopropanol using all the calibration sample spectra, a quadratic baseline, and the first 8 eigenvectors generated from all repeat sample spectra.

Selection of eigenvectors can be made more systematic by using the standard CLS model applied to the eigenvector spectra obtained from the repeat samples. Only those eigenvectors that contribute significantly to the prediction error variance are added to the PACLS analysis. Alternatively, the eigenvectors representing the inverse of the squared NAS to squared prediction error (or inverse of the change in the squared NAS divided by the squared prediction error) can be used in the selection of eigenvectors to include in the PACLS analysis. These latter methods suggest that addition of the first 7 to 10 factors should yield the best PACLS prediction results. Cross-validation with addition of eigenvectors could also be used for selection of eigenvectors to include in the PACLS analysis similar to the manner in which cross-validation is used in PLS to select factors (see D. M. Haaland, "Methods to Include Beer's Law Nonlinearities in Quantitative Spectral Analysis," in ASTM Special Technical Publication, *Computerized Quantitative Infrared Analysis,* G. L. McClure, Editor, STP 934, 78–94 (1987)). FIG. 7 presents the cross-validated PACLS results for isopropanol after adding the first 8 eigenvectors to the CLS prediction portion of the analysis. Comparing the cross-validated SEP results for the PACLS and PLS methods suggests that PACLS outperforms the generally higher precision PLS method. However, PACLS has been presented with information about the repeat samples that PLS model developed for FIG. 6 was not given. If the repeat spectra are added to the PLS analysis, then the CVSEP for PLS is 9.6 ppm if the repeat sample predictions are excluded from the CVSEP calculation in order to make a direct comparison between PLS and PACLS using the same information and prediction samples. Thus, PACLS cross-validated predictions are comparable to those found for PLS. This is the first case where CLS-type methods have been found to be comparable to PLS for condensed phase systems that experience appreciable system drift.

Figure 8:
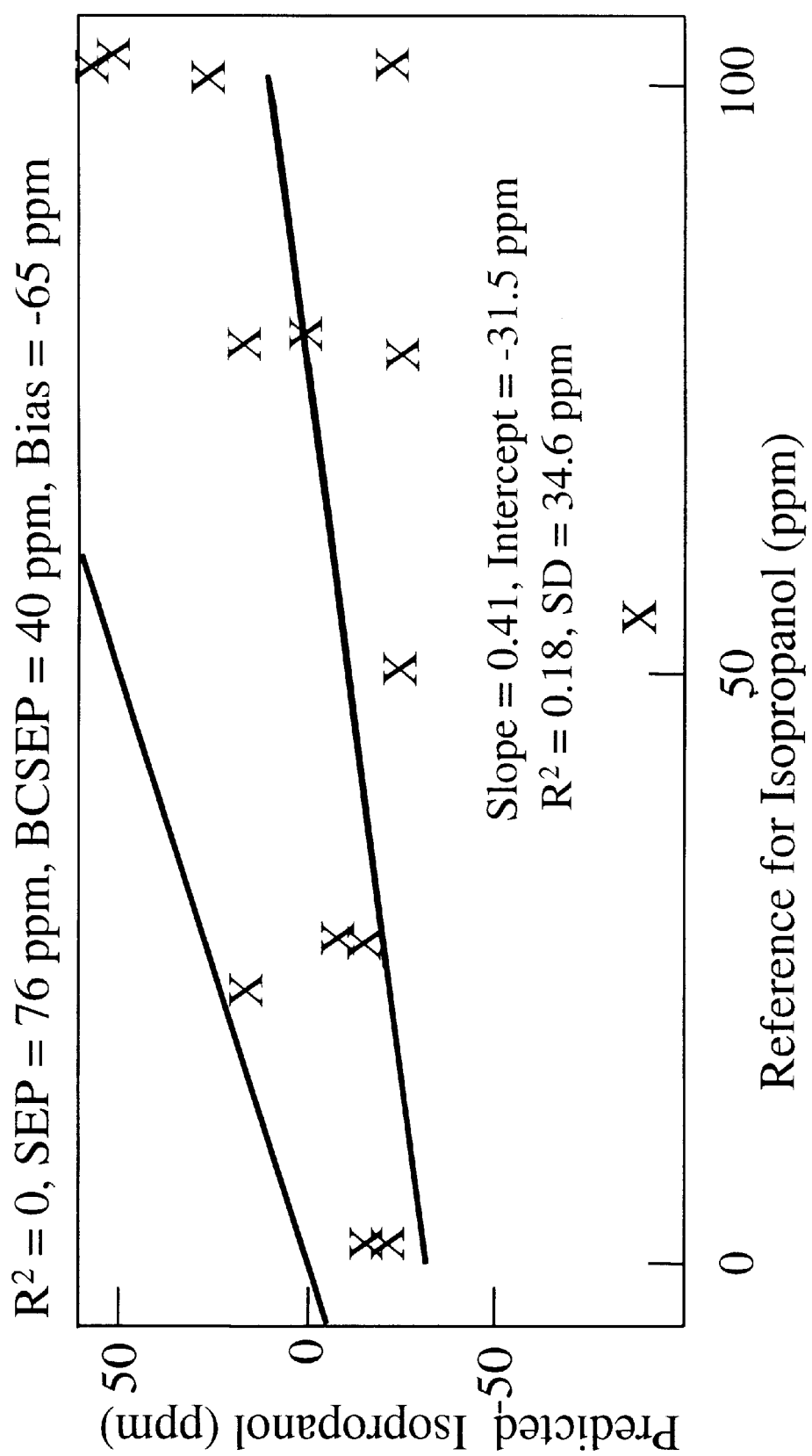
FIG. 8 is graph showing a CLS prediction of the afternoon calibration sample spectra based upon a CLS model generated on the morning calibration and morning repeat sample spectra. The line below the line of identity is the linear least-squares fit to the data.
Figure 9:
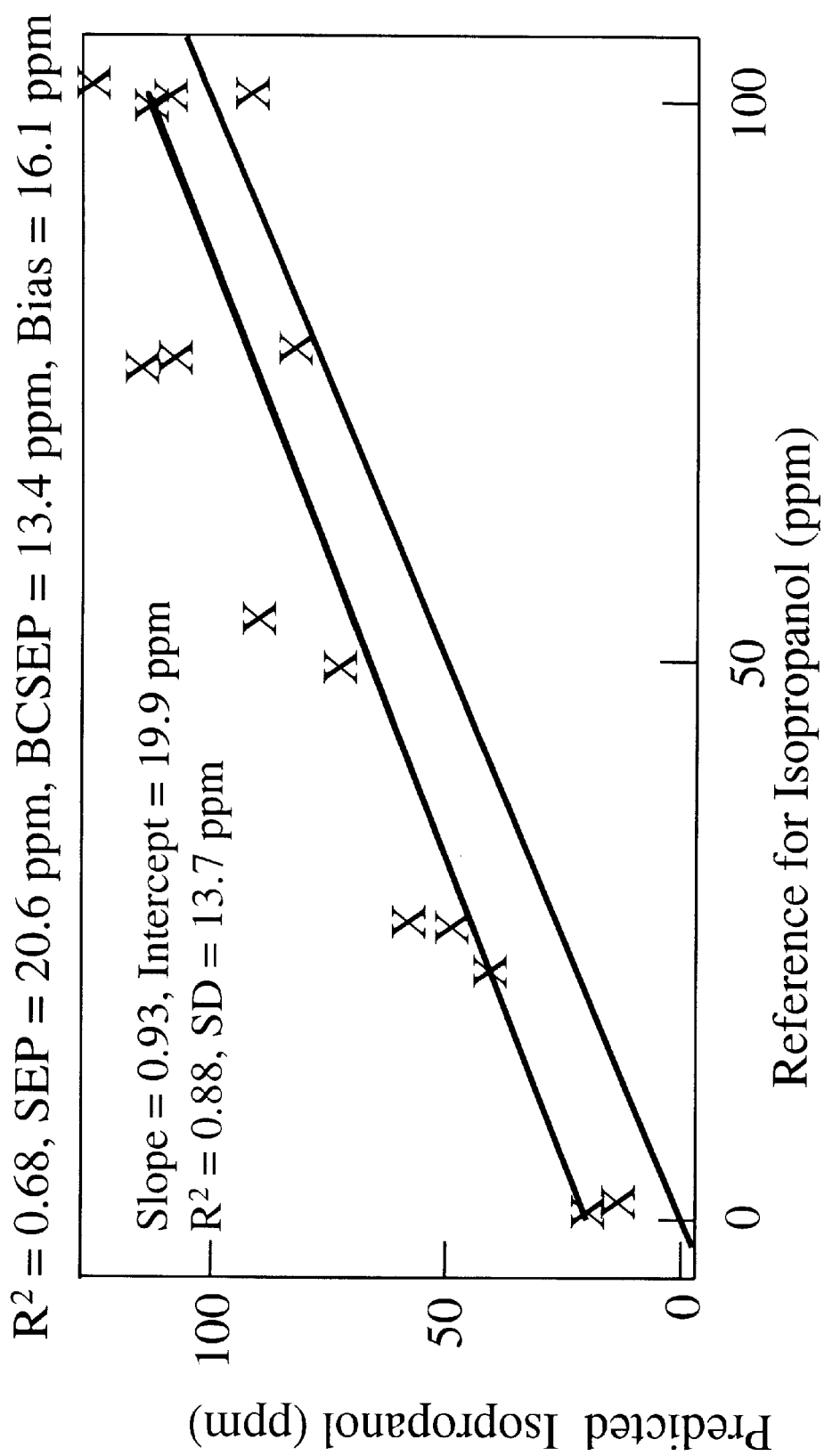
FIG. 9 is a graph of a PLS prediction of the afternoon calibration sample spectra based upon a PLS model generated on the morning calibration and morning repeat sample spectra. The line above the line of identity is the linear least-squares fit to the data.

A demonstration of calibration maintenance using PACLS can also be made using the same set of spectral data as described above for isopropanol analysis. If the data set is separated into morning and afternoon sets of sample spectra, then this same data set can be used to test the abilities of PACLS and PLS to maintain a calibration in the presence of a strongly drifting spectrometer/sensor system. Because the system drift is the dominant source of spectral variance, this represents a challenging test for PACLS to maintain a calibration. Initially, PLS and CLS models were built based upon all the morning calibration and morning repeat data. These PLS and CLS models were then used to predict all the non-repeat sample spectra from the afternoon. The resulting predictions are shown in FIGS. 8 and 9 for CLS and PLS, respectively. The CLS prediction is not useful, while the PLS prediction is better but exhibits both a bias and some loss of precision. The expected line of identity and the linear-least-squares fit of the prediction data are included in these plots. Also presented in the plots are the SEP, bias-corrected SEP (BCSEP), and the bias for the predictions. The slope, intercept, squared correlation coefficient ($R^2$), and standard deviation (SD) of the predictions about the linear-least-squares fit of the prediction data are also presented in the figures.

Figure 10:
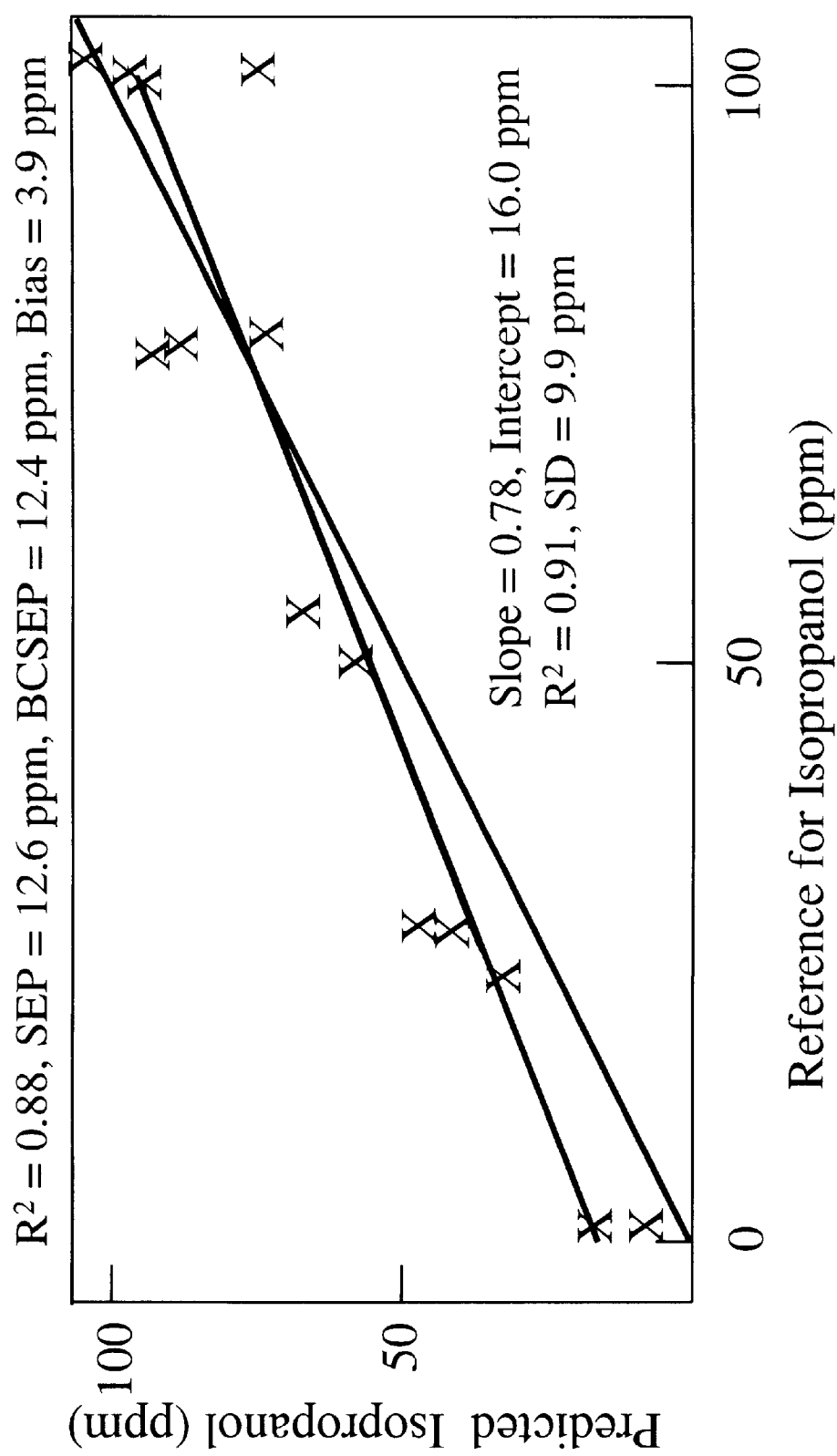
FIG. 10 is a graph of a PLS prediction of the afternoon calibration sample spectra based upon a PLS model generated on the morning calibration sample spectra and morning and afternoon repeat sample spectra. The line above the line of identity on the left is the linear least-squares fit to the data.
Figure 11:
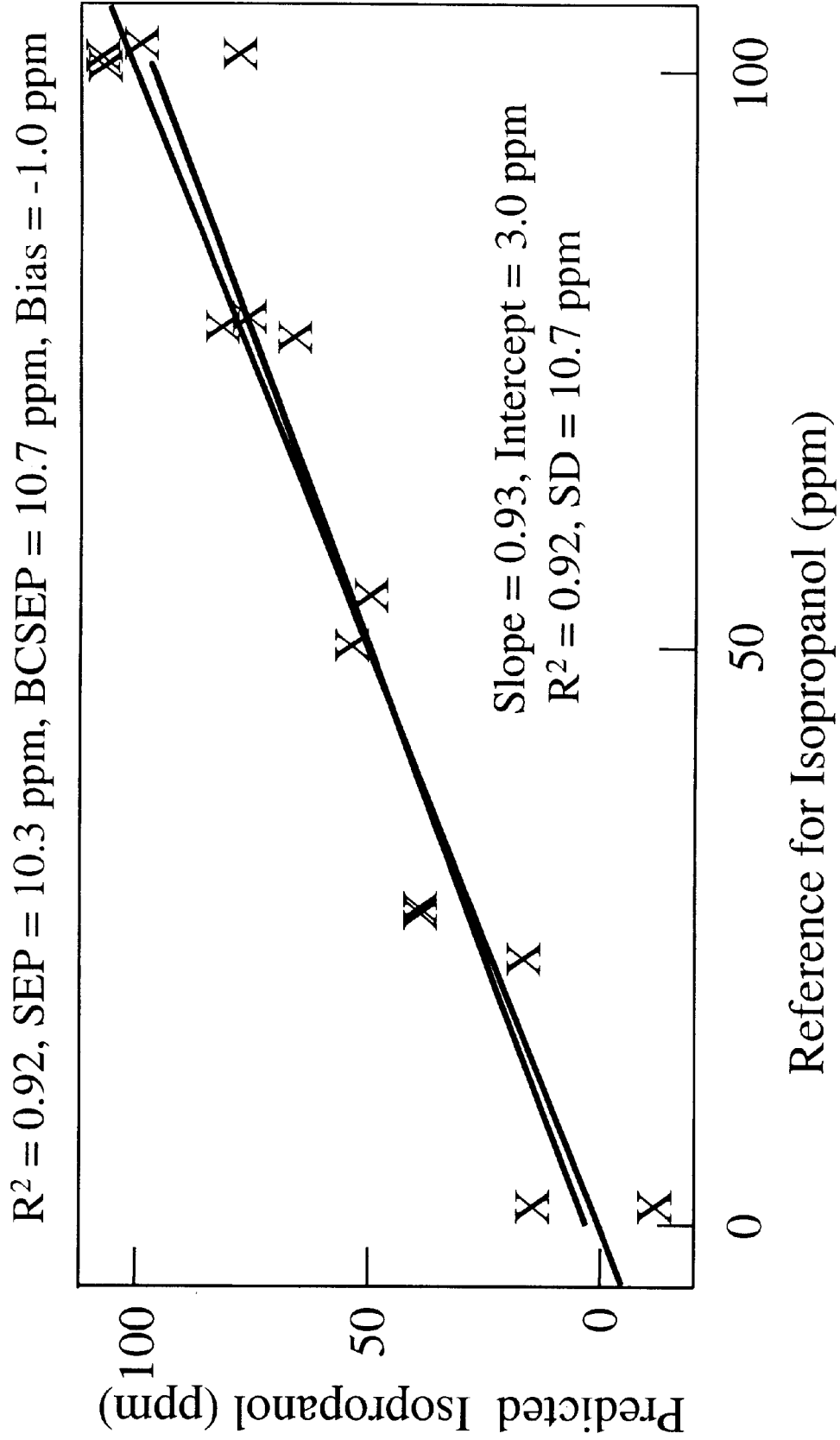
FIG. 11 is a graph of a PACLS prediction of the afternoon calibration sample spectra based upon a PACLS model generated on the morning calibration sample spectra and the first 8 eigenvectors obtained from the morning and afternoon repeat sample spectra. The line above the line of identity on the left is the linear least-squares fit to the data.

The PLS and PACLS calibrations were then built using all the morning calibration samples and all the repeat spectral information from both the morning and the afternoon parts of the experiment. PACLS used the first 8 eigenvectors developed from the 43 repeat spectra. The prediction of the afternoon repeat spectra is shown in FIGS. 10 and 11 for PLS and PACLS, respectively. In this case of true prediction, PACLS actually yields lower prediction errors than obtained for the PLS model (i.e., SEP of 10.3 and 12.6 ppm for PACLS and PLS, respectively). Thus, PACLS is found to significantly outperform CLS and is again competitive with, or in this case, superior to the PLS calibration method.

Alternatively, if predictions that are near real time are required, then the PACLS can be performed in a different manner than presented above. We have taken the same morning and afternoon data set presented above and performed analyses using either the nearest repeat before or the nearest repeats before and after the prediction spectra were obtained to update the PACLS model. In this case, the spectral shapes added in the PACLS analysis were the first 8 eigenvectors from the morning repeats and the difference between the average morning repeat spectrum and the selected afternoon repeat spectrum or spectra. When the surrounding afternoon repeat spectra were used in the PACLS prediction, then the SEP of the afternoon spectra was found to be 9.6 ppm, i.e., somewhat better than the 10.3 ppm result above. When only the single nearest repeat sample was added, the prediction SEP results only degraded by <2 ppm. PLS required that the selected afternoon repeats before and after the sample spectra be added to the morning calibration spectra and a PLS recalibration performed. The results of these recalibration PLS models was an SEP of 13.2 ppm. Thus, for near real-time predictions, PACLS significantly outperforms PLS and does not require the recalibration that PLS demands.

Figure 12:
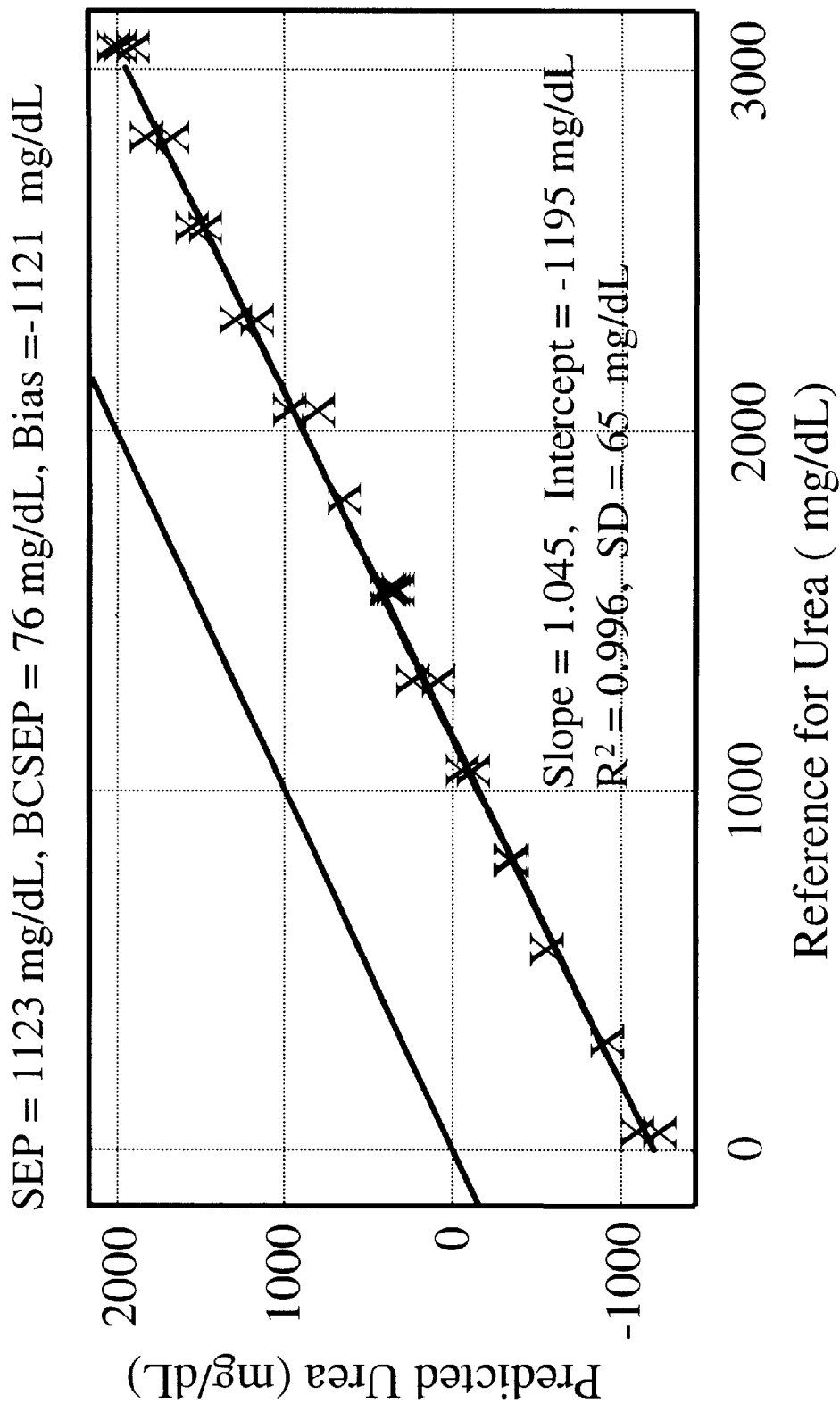
FIG. 12 is a graph of urea CLS predictions for sample spectra obtained on a secondary spectrometer based upon a urea CLS calibration model using sample spectra obtained on the primary spectrometer. The line below the line of identity is the linear least-squares fit to the data.

The final demonstration of the PACLS method is in its use for calibration transfer between two spectrometers. In this case, the near infrared spectra of the 31 samples of dilute aqueous solutions of urea, creatinine, and NaCl described in the first example in this discussion were obtained on both primary and secondary spectrometers. The standard CLS calibration model was built using the spectra obtained on the primary spectrometer at a constant temperature of 23° C. The cross-validated CLS predictions are shown in FIG. 1 for these calibration data. This model was then applied directly to spectra obtained on a second Nicolet 800 spectrometer using the same samples again equilibrated to 23° C. The CLS prediction results of urea are presented in FIG. 12. Clearly there is a large bias and loss of precision on the secondary spectrometer primarily due to differences in the spectra obtained on the two spectrometers. However, instrument drift also contributes to this error.

Figure 13:
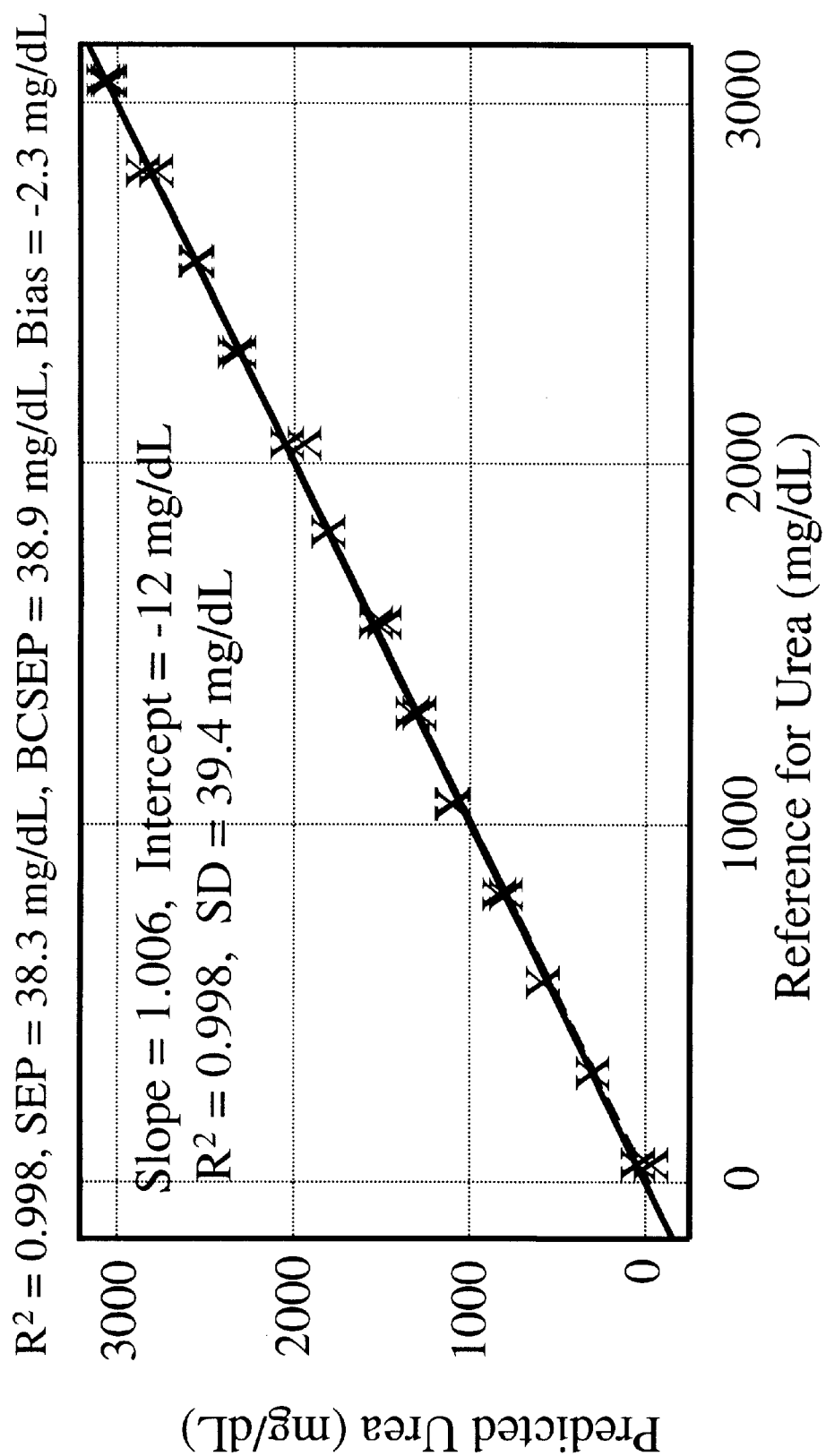
FIG. 13 is a graph of urea PACLS predictions for sample spectra obtained on a secondary spectrometer based upon a PACLS calibration model using sample spectra obtained on the primary spectrometer plus spectral difference shapes from 5 subset samples run on both spectrometers. The line of identity and the linear least-squares fit to the data are indistinguishable in this plot.

A subset of the same 5 samples selected in the first example of this description was measured on both the primary and secondary spectrometers. The difference absorbance spectra from corresponding pairs of samples measured on the two spectrometers were then calculated. These difference spectra can be used in the PACLS algorithm to correct for both spectrometer differences and to some extent correct for spectrometer drift within and between the two sets of spectral data. Although the mean difference spectrum and the eigenvectors generated from the mean-centered difference spectra could be used to select the spectral shapes to add to the PACLS algorithm, the optimal results were obtained with all 5 spectral difference shapes added to the PACLS analysis. FIG. 13 demonstrates the improvement in true prediction for urea using the PACLS algorithm. In fact, the prediction ability with PACLS is better than that found for the original CLS calibration model in FIG. 1 (i.e., SEP improves from 64 to 38 mg/dL). As in the first example, the improvement in prediction relative to the original CLS calibration is due to the partial modeling of spectrometer drift that is represented in these set of five subset samples. Similar improvements are found for the creatinine and NaCl analytes. It is interesting to speculate that if repeat sample spectra had been obtained during the collection of the data on the two spectrometers, even better calibration and prediction precisions would be expected in this case where instrument drift is appreciable but not adequately modeled in either the CLS or PACLS predictions.

Figure 14:
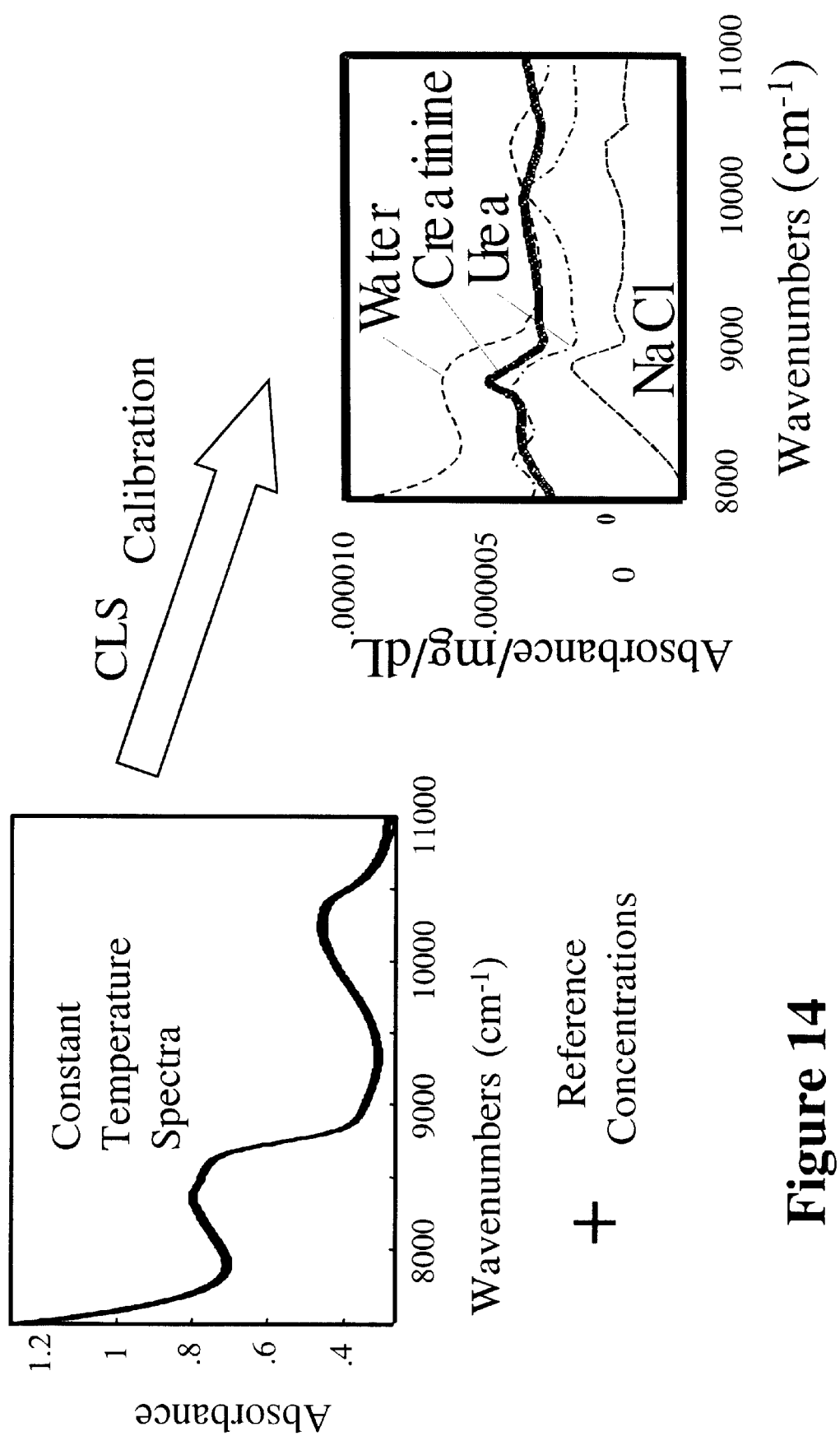
FIG. 14 outlines the steps of the PACLS calibration for all solution components using the example of urea analysis in constant-temperature aqueous solutions.
Figure 16:
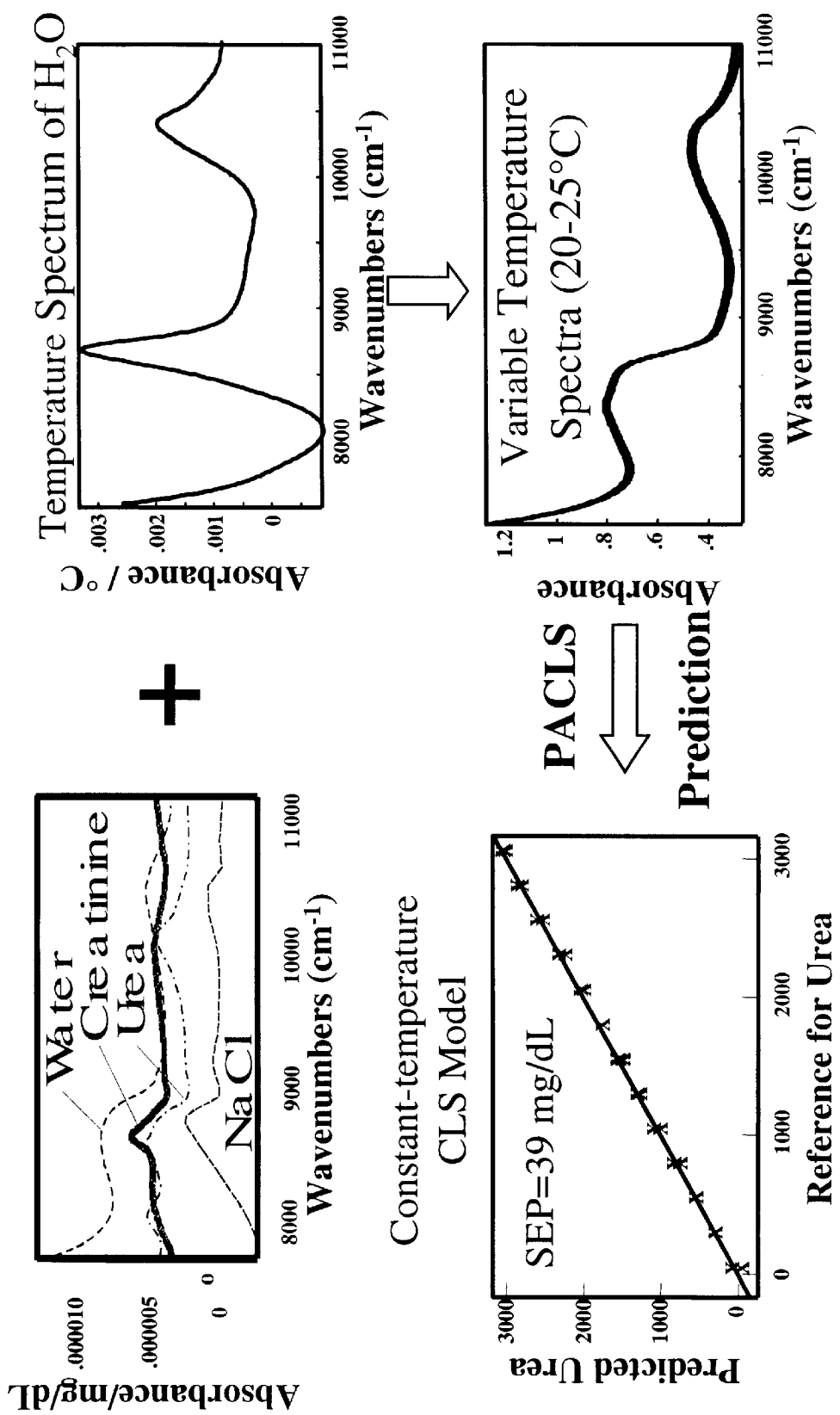
FIG. 16 outlines the PACLS prediction step for urea with the spectral shape of the effect of temperature added to the constant temperature model when predicting the variable temperature solution spectra.

The following figures use the aqueous solution example above for urea to demonstrate graphically the workings of the PACLS algorithm. FIG. 14 outlines the steps of the PACLS calibration for all solution components using the example of urea analysis in constant-temperature aqueous solutions. FIG. 15 gives the PACLS prediction model and solution along with a graphical representation of the method by which the spectral shapes are added during PACLS prediction. The underlined concentrations represent the augmented concentration values for the added spectral shapes (baseline offset, baseline slope, and pure-component estimate of the shape of the effect of temperature). The dashed lines represent the corresponding augmented spectral shapes added during PACLS prediction. FIG. 16 outlines the PACLS prediction step for urea with the spectral shape of the effect of temperature added to the constant temperature model when predicting the variable temperature solution spectra.

CONCLUSIONS

PACLS has been described and multiple uses, implementations, and applications have been presented for quantitative and qualitative spectral analysis. Clearly PACLS is a new implementation of the CLS algorithm that greatly enhances its capabilities, accuracy, precision, and range of problems that can be addressed with CLS-type multivariate methods. Examples have been presented that show the power of PACLS to 1) incorporate unmodeled components or other spectral information into the multivariate models, 2) incorporate spectrometer/sensor drift into the model to maintain a calibration on a drifting spectrometer, and 3) transfer these multivariate spectral models between spectrometers. With the collection of the proper spectral data, PACLS can be competitive with or even better than PLS and PCR. The PACLS calibration generally requires fewer calibration samples than these factor analysis methods and therefore, PACLS can become the method of first choice. Other features and potential capabilities of the new PACLS algorithm have been described that further enhance its potential. Clearly, the PACLS algorithm has been shown to yield dramatic improvements in the analysis of multivariate spectral data and will further impact many areas and applications of spectral analysis in the future.

In reviewing the following claims, one should appreciate that certain terms used therein may include meanings that are somewhat expanded beyond the conventional usage of the word or words. For example, "spectral shapes" is meant to include not only continuous shapes but can also include discontinuous sections or even discrete points within its definition. "Set" can include many elements or a few as a single element. "Sources of spectral variation" will normally mean chemical constituents but can also mean other sources of spectral variation such as temperature/pH shifts, diffraction effects, spectrometer or system drift, sample insertion effects, chromatic aberrations, changes in spectrometers or spectrometer components, purge gas variations, changes in multi- and hyperspectral images, changes in spectral returns from a satellite image evoked by a change in the scanned real estate as the satellite passes over the scene, etc.

What is claimed is:

1. A method for performing a classical least squares estimation of the value of at least one source of spectral variation of a sample comprising:

utilizing a previously constructed calibration data set wherein the constituents of such calibration data set include at least one of the sources of spectral variation that affect the optical response of the sample to be measured, such calibration data set yielding a matrix $\hat{K}$ representing the combination of the vectors containing the at least one spectral shape of the measured sources of spectral variation;

measuring the optical response of a sample set that contains the at least one of the sources of spectral variation in the calibration data set and at least one additional source of spectral variation whose value was not represented in the original calibration data set, said measurement forming a prediction data set;

adding at least one vector representing a spectral shape that is representative of the at least one additional source of spectral variation in the prediction data set to the matrix $\hat{K}$ to form an augmented matrix $+\tilde{e},\overline{cir}$ $\hat{K}+ee$; and estimating the value of the at least one of the sources of spectral variation in the calibration data set or the at least one additional source of spectral variation in the sample by a classical least squares prediction utilizing the augmented matrix $+\tilde{e},\overline{cir}$ $\hat{K}+ee$, wherein the at least one additional source of spectral variation is a non-baseline source of spectral variation.

2. The method of claim 1 wherein the spectral shape that is representative of the at least one additional source of spectral variation is generated from spectral measurements of pure samples of chemical constituents that are the at least one additional source of spectral variation, for constituents that are not affected by interactions with the sample.

3. The method of claim 1 wherein the spectral shape that is representative of the at least one additional source of spectral variation is generated from spectral measurements of representative calibration samples that have been spiked with a chemical constituent or parameter of interest, then subtracting out the representative calibration sample spectrum to leave the spectral shape of the chemical constituent or the parameter of interest.

4. The method of claim 1 wherein the spectral shape that is representative of the at least one additional source of spectral variation is generated from taking repeated spectral measurements of a representative calibration sample and then subtracting the original spectral measurement of the representative calibration sample from the rest of the measurements.

5. The method of claim 4 wherein the representative sample is a sample near the midpoint of the concentration range for that representative sample.

6. The method of claim 5 wherein the representative sample further includes samples at the extreme ends of its concentration range.

7. The method of claim 1 wherein a particular vector selected to represent a spectral shape to add to the matrix $\hat{K}$ corresponds to an eigenvector that represents at least one additional source of spectral variation in the prediction data set whose value was not represented in the calibration data set.

8. The method of claim 7 wherein the eigenvector is selected based on a functional form relating a prediction error from a calibration model to the eigenvector and a net-analyte signal.

9. The method of claim 1 wherein the at least one additional source of spectral variation is due to a change in spectrometers between a primary spectrometer and a secondary spectrometer and the at least one spectral shape representing this change is the difference between a spectral shape of at least one sample measured on the primary spectrometer and a spectral shape of the same at least one sample measured on the secondary spectrometer or is an eigenvector or other linear combination of spectral shapes obtained from the spectral differences.

10. The method of claim 1 wherein the at least one additional source of spectral variation is due to a plurality of individual effects from several different sources that are not analyzed in the prediction data set and the spectral shape of this plurality is generated from the several different sources of spectral variations that are varied while the sources of spectral variation in the calibration data set that will be measured in the prediction data set are held at zero value or a constant value.

11. The method of claim 1 wherein there is a change in a constituent sample in the calibration data set from a measurement taken at a first time and a measurement taken at a second time due to a change in the sample itself, wherein the spectral shape that is representative of the at least one additional source of spectral variation that is due to this change is generated by taking the difference between the spectral measurements of the sample at the first time and the second time.

12. The method of claim 1 wherein the at least one additional source of spectral variation is due to a non-linear effect in a spectrographic system and the spectral shape is generated artificially by adding nonlinear effects to the calibration data set and then selecting at least one vector representing the non-linearity in the calibration data set matrix as the spectral shape.

13. The method of claim 12 wherein the non-linear effect is an effect caused by stray light.

14. The method of claim 12 wherein the non-linear effect is an effect cause by detector nonlinearities.

15. The method of claim 1 wherein the at least one additional source of spectral variation is that of a non-linear detector response and the spectral shape is generated by first subtracting a constant amount of intensity from all single-beam sample spectral intensities in the calibration data set matrix to simulate a first non-linear detector response and then selecting a vector representing error in the calibration data set matrix as the spectral shape.

16. A method for estimating a measure of at least one component within a sample including a plurality of components, comprising the steps of:

a) obtaining a calibration data set $A_1$ composed of first attributes $K_1$ of the plurality of components within a first sample set $S_1$ composed of at least two different samples;

b) obtaining a second data set $A_2$ composed of second attributes $K_2$ of the plurality of components within a second sample set $S_2$, wherein the second sample set $S_2$ includes at least one component not in the first sample set $S_1$;

c) estimating a third attribute $K_3$ of the at least one other component not in the first set $S_1$ of samples and combining it with calibration model from $A_1$ to obtain an augmented set of attributes $\hat{K}$; and d) predicting a measure of at least one component in the second sample set $S_2$ according to $\tilde{C}=(\tilde{K}^T\tilde{K})^{-1}\tilde{K}^TA \approx \tilde{K}A$.

17. The method of claim 16, wherein the first attributes $K_1$ comprise a plurality of responses of the individual components within the first set $S_1$ of samples to an applied energy source selected from the group consisting of: electromagnetic, electric, magnetic, acoustic, thermal, and mechanical.

18. The method of claim 17, wherein the first attributes $K_1$ can be represented as a vector or matrix $K_{ji}$, where i is one element of the response for the $j^{th}$ component within the first set $S_1$ of samples.

19. The method of claim 17, wherein the first set of attributes $K_1$ comprise a spectral response.

20. The method of claim 19, wherein the estimated attribute $K_3$ comprises an estimated spectral shape of the spectral response of at least one component within the sample set $S_2$.

21. The method of claim 20, where the spectral shape is generated by first subtracting a constant amount of intensity from all single-beam sample spectral intensities in the calibration data set to simulate a first non-linear detector response.

22. The method of claim 16, wherein the estimated attribute $K_3$ can be represented as a vector or matrix.

23. The method of claim 22, further including selecting a vector representing error in the calibration data set $A_1$ as the spectral shape.

24. The method of claim 16, wherein the at least one attribute $K_3$ not in the first set of attributes $K_1$ is for at least one component not in the first set $S_1$ of samples.

25. The method of claim 16, wherein the at least one attribute $K_3$ not in the first set of attributes $K_1$ is for at least one source of variation not in the first calibration data set $A_1$.

26. The method of claim 16, wherein the calibration data set $A_1$ represents vectors expressing the spectral responses and concentrations of know components within the first sample set $S_1$.

27. The method of claim 24, wherein the at least one source of variation not in the first calibration data set is selected from the group consisting of: spectrometer drift, changes in spectrometers, temperature variations, optical variations including sample insertion effects, chromatic variations, diffraction effects, and differences resulting from related chemical analogues in the sample.

28. The method of claim 16, wherein the estimated attribute $K_2$ comprises at least one vector expressing the spectral response of at least one additional component not in the prediction data set $S_2$.

29. A method for estimating a measure of at least one component within a sample including a plurality of components, comprising the steps of:

a) obtaining a calibration data set $A_1$ composed of first attributes $K_1$ of the plurality of identified components within a first sample set $S_1$ composed of at least two different samples;

b) obtaining a measure $E_A$ of unknown variables in the calibration data set $A_1$ and separating $E_A$ into coherent P and incoherent E components;

c) augmenting the first set of attributes $K_1$ with at least one coherent P and at least one incoherent E components to obtain an augmented first set of attributes $\tilde{K}_1$;

d) obtaining a second data set $A_2$ composed of second attributes $K_2$ of the plurality of components within a second sample set $S_2$, wherein the second sample set $S_2$ includes at least one component not in the first sample set $S_1$;

e) estimating a third attribute $K_3$ of the at least one other component not in the first set $S_1$ of samples and combining it with calibration model from $A_1$ to obtain a second augmented set of attributes $\tilde{K}_2$; and f) predicting a measure of at least one component in the second sample $S_2$ according to $\tilde{C}=(\tilde{K}^T\tilde{K})^{-1}\tilde{K}^TA \approx \tilde{K}A$.

30. The method of claim 16 wherein the functional form comprises the inverse of the ratio of the squared change in the net-analyte signal and the squared prediction error.

* * * * *